(12) United States Patent
Iwamoto et al.

(10) Patent No.: US 8,743,150 B2
(45) Date of Patent: Jun. 3, 2014

(54) DISPLAY PROCESSING DEVICE AND DISPLAY CONTROL METHOD

(75) Inventors: Taro Iwamoto, Tokyo (JP); Akihiko Takizawa, Tokyo (JP); Takeshi Kimoto, Kanagawa (JP); Mitsuhiro Yashiro, Kanagawa (JP); Makoto Nishiyama, Tokyo (JP)

(73) Assignee: Alpine Electronics, Inc., Tokyo (JP)

( * ) Notice: Subject to any disclaimer, the term of this patent is extended or adjusted under 35 U.S.C. 154(b) by 1241 days.

(21) Appl. No.: 12/166,659

(22) Filed: Jul. 2, 2008

(65) Prior Publication Data

US 2009/0009535 A1 Jan. 8, 2009

(30) Foreign Application Priority Data

Jul. 2, 2007 (JP) ................................. 2007-174091

(51) Int. Cl.
*G09G 5/00* (2006.01)
(52) U.S. Cl.
USPC ........................................................ 345/667
(58) Field of Classification Search
CPC ............. G06F 2203/04806; G09G 2340/0407; G09G 2340/045; G01C 21/367
USPC .......................... 345/660, 666, 667, 668, 663
See application file for complete search history.

(56) References Cited

U.S. PATENT DOCUMENTS

| 5,812,111 | A | * | 9/1998 | Fuji et al. ...................... 345/667 |
| 6,445,999 | B1 | | 9/2002 | Nakamura |
| 2004/0066393 | A1 | * | 4/2004 | Cragun .......................... 345/660 |
| 2004/0263537 | A1 | * | 12/2004 | Faraday et al. ............... 345/660 |
| 2008/0218523 | A1 | * | 9/2008 | Zuverink ...................... 345/473 |
| 2008/0238947 | A1 | * | 10/2008 | Keahey et al. ................. 345/666 |

FOREIGN PATENT DOCUMENTS

| JP | 08-328467 | * 12/1996 |
| JP | 09-210703 | 8/1997 |

* cited by examiner

*Primary Examiner* — Jeffery A Brier
(74) *Attorney, Agent, or Firm* — Brinks Gilson & Lione

(57) ABSTRACT

A display processing device for displaying a display object in a display window and changing a display range includes a sectioning unit that divides the display window into a plurality of sections (screens) by creating boundary lines. Maps of geographical ranges to be displayed are sectioned and displayed in the plurality of screens. In the event that a boundary line is moved through a user input, the geographical ranges of the maps in the screens for which the screen size has become larger than an initial screen size are enlarged, and the maps in the screens which have become smaller than the initial screen size are reduced in scale in accordance with the reduction in screen size, while maintaining the geographical range of the maps displayed in the display window prior to the boundary line being moved.

17 Claims, 17 Drawing Sheets

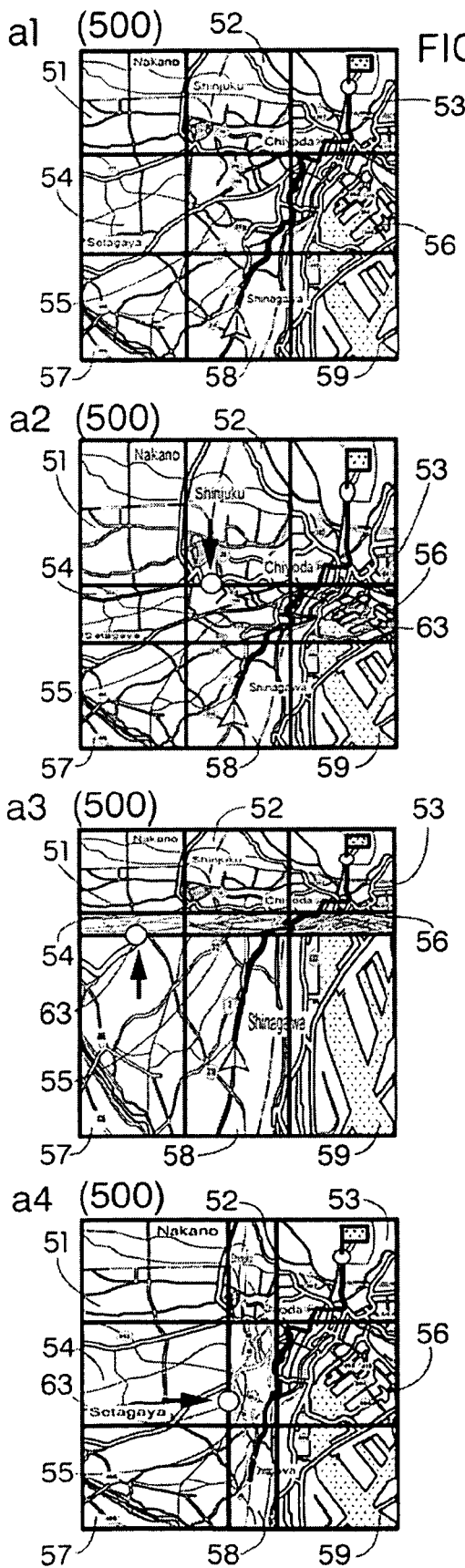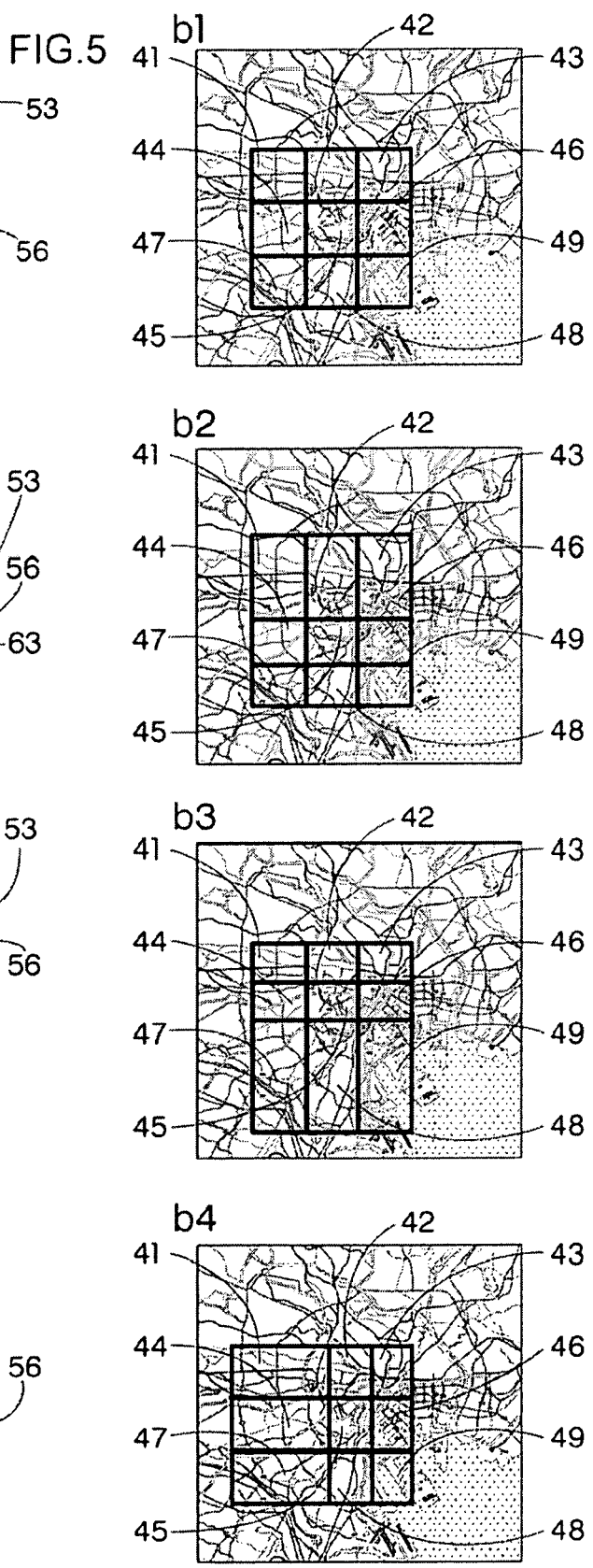
FIG.5

FIG.7
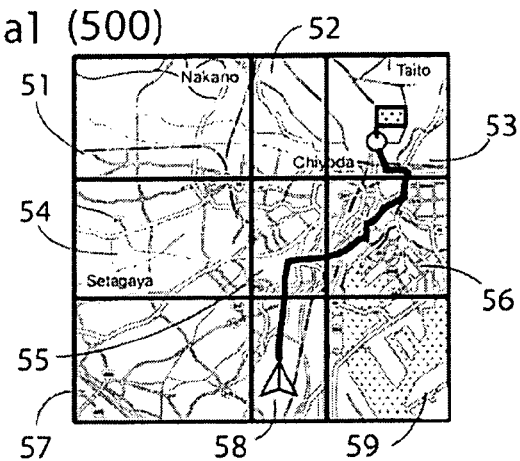
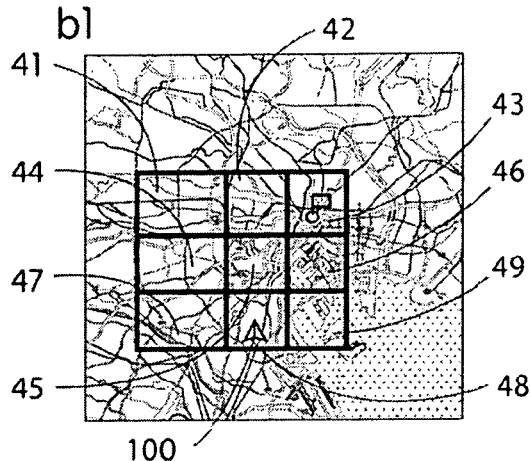
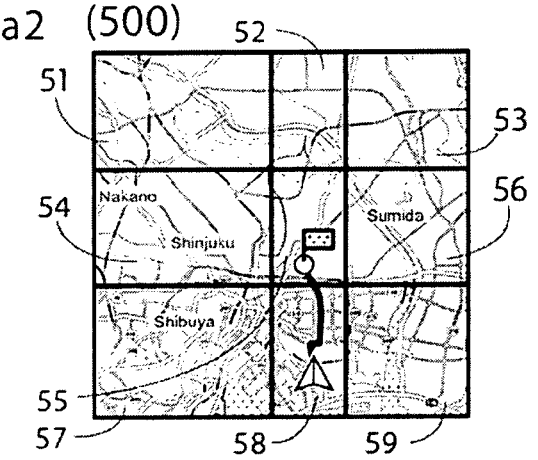
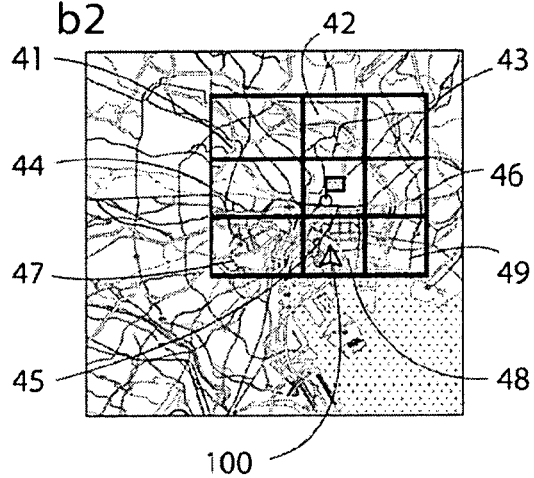
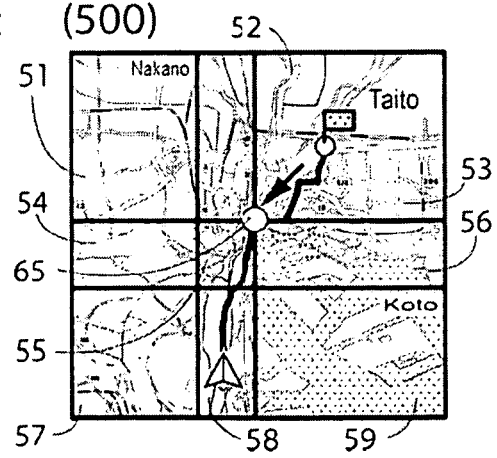
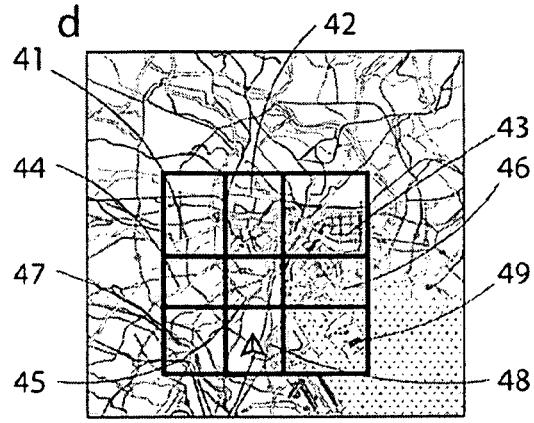

BACKGROUND OF THE INVENTION

1. Field of the Invention
The present invention relates to a map search-and-display method for capturing the positioned relationship between two points at a predetermined distance from each other and obtaining detailed maps showing the two points and areas therearound.

FIG.8b (500)

at a predetermined area near the outer circumference of a screen image during cursor-moving map scroll display is performed, a map-display-scale calculation unit calculates a wide-area map on a predetermined scale for displaying the current position and the cursor position on the same screen and a two-point-display map-search display searches for and displays a predetermined map.

What is claimed is:

1. A map search-and-display method comprising the acts of: displaying a two-point display map showing a first point and a second point at a distance from each other; and displaying a detailed map for the first point in a separate-frame window at a position on the two-point display map corresponding to the location of the first

FIG.8c (500)

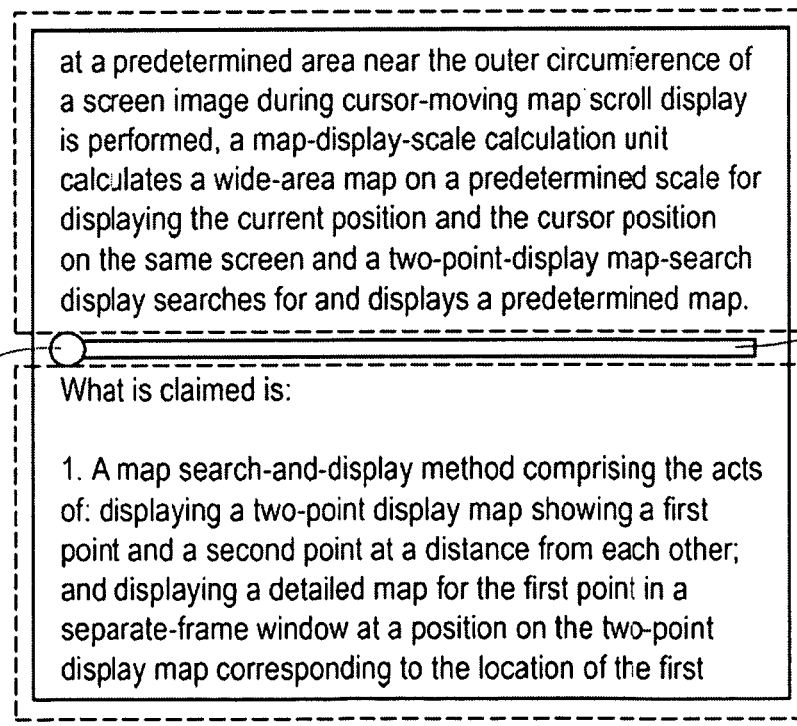

at a predetermined area near the outer circumference of a screen image during cursor-moving map scroll display is performed, a map-display-scale calculation unit calculates a wide-area map on a predetermined scale for displaying the current position and the cursor position on the same screen and a two-point-display map-search display searches for and displays a predetermined map.

What is claimed is:

1. A map search-and-display method comprising the acts of: displaying a two-point display map showing a first point and a second point at a distance from each other; and displaying a detailed map for the first point in a separate-frame window at a position on the two-point display map corresponding to the location of the first FIG.8d (500)
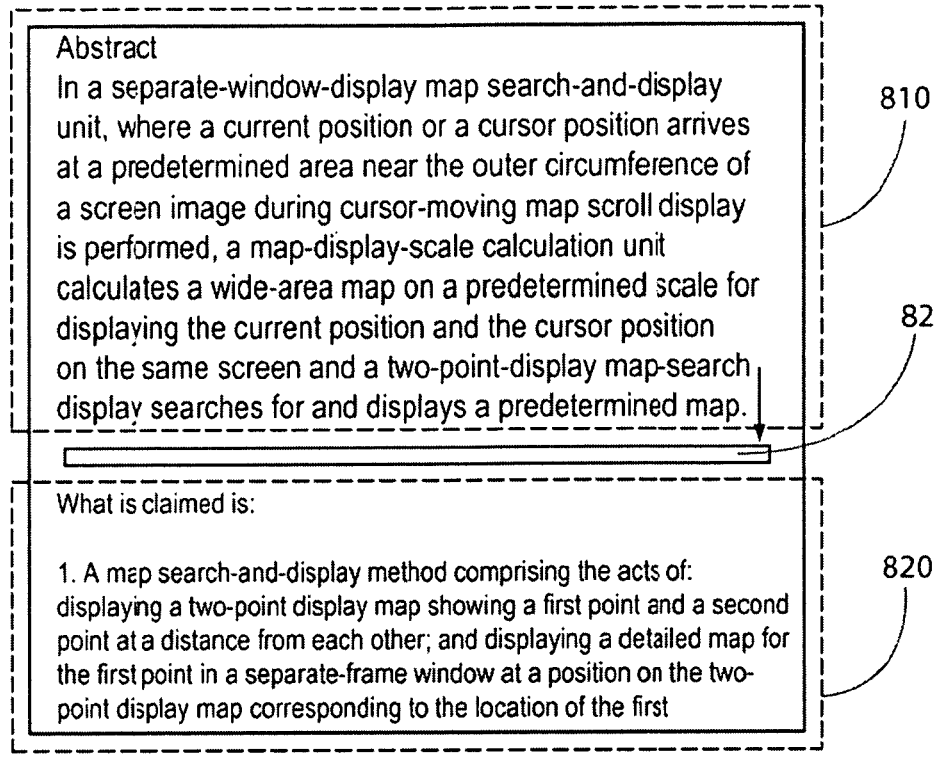
FIG.8e (500)
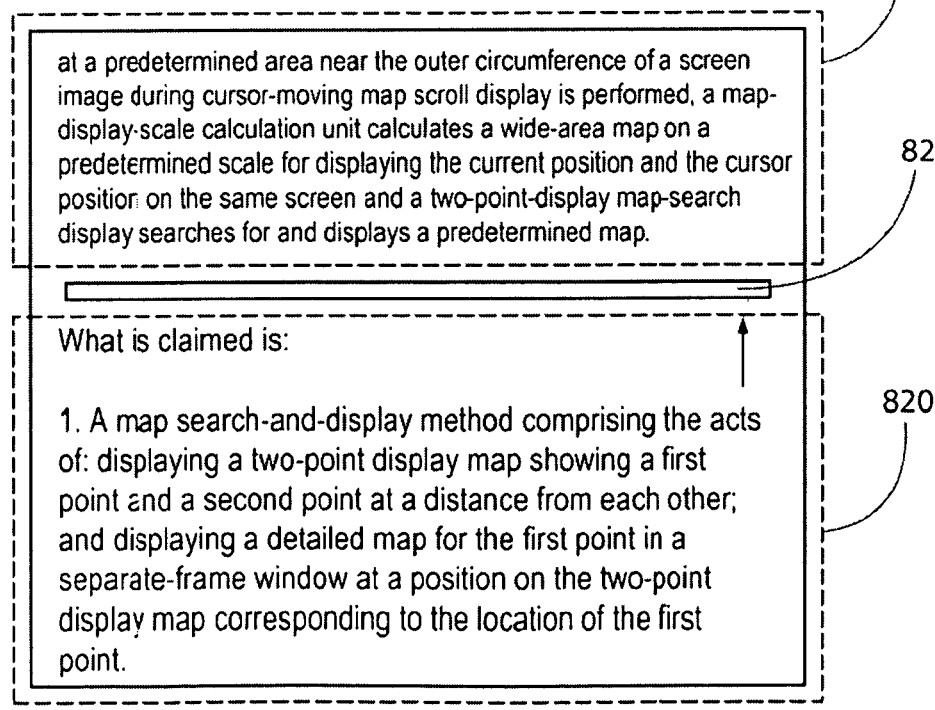

FIG.9a (500)

Abstract
In a separate-window-display map search-and-display unit, where a current position or a cursor position arrives at a predetermined area near the outer circumference of a screen image during cursor-moving map scroll display is performed, a map-display-scale calculation unit calculates a wide-area map on a predetermined scale for displaying the current position and the cursor position on the same screen and a two-point-display map-search display searches for and displays a predetermined map. A separate-frame-window-display detailed-map search-and-display unit displays a current-position-centered detailed map and a cursor-position-centered detailed map in separate frame windows.]

What is claimed is:

1. A map search-and-display method comprising the acts of: displaying a two-point display map showing a first point and a second point at a distance from each other; and displaying a detailed map for the first point in a separate-frame window at a position on the two-point display map corresponding to the location of the first point.

BACKGROUND OF THE INVENTION

1. Field of the Invention
The present invention relates to a map search-and-display method for capturing the positioned relationship between two points at a predetermined distance from each other and obtaining detailed maps showing the two points and areas therearound.

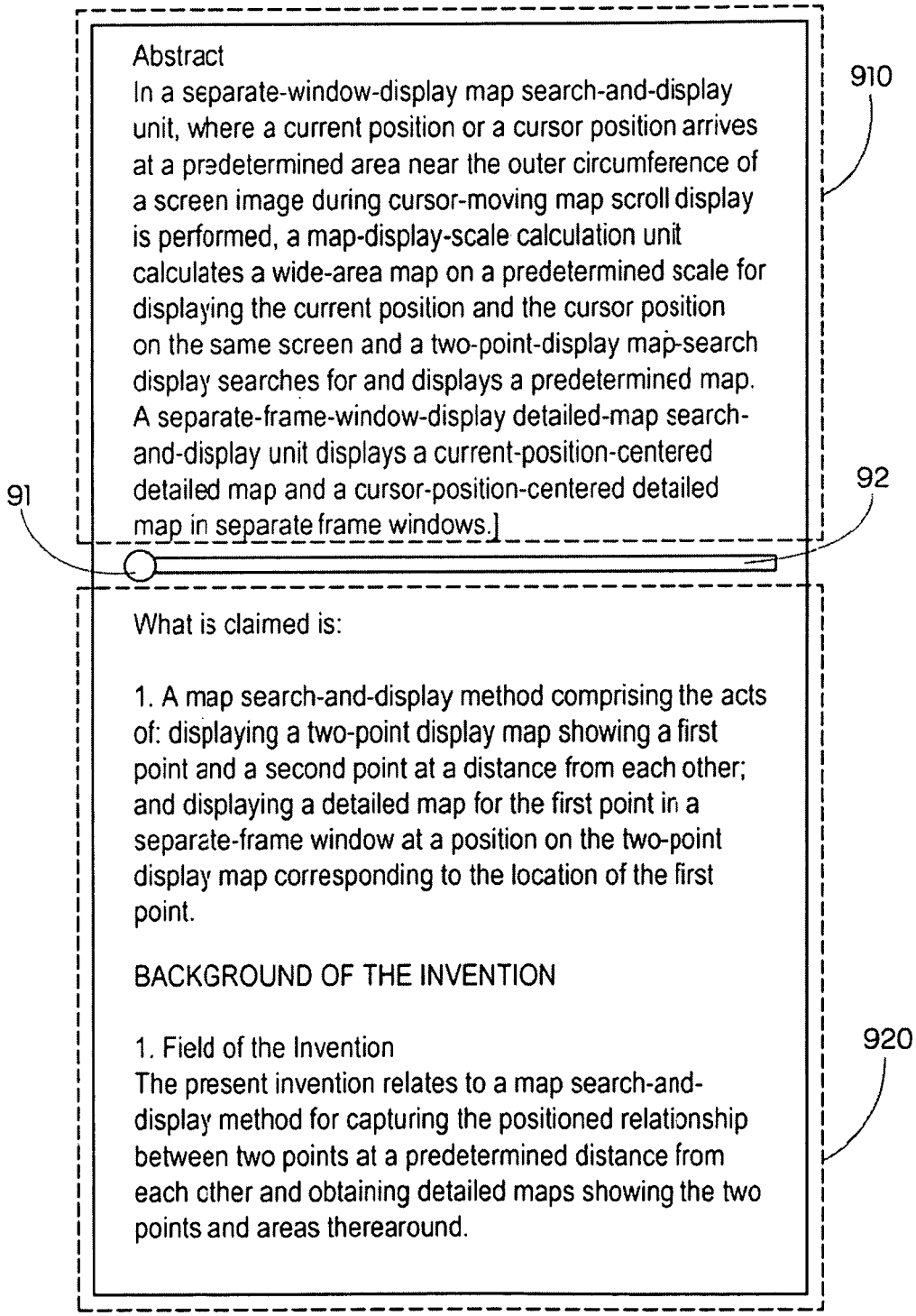

FIG. 9c (500)
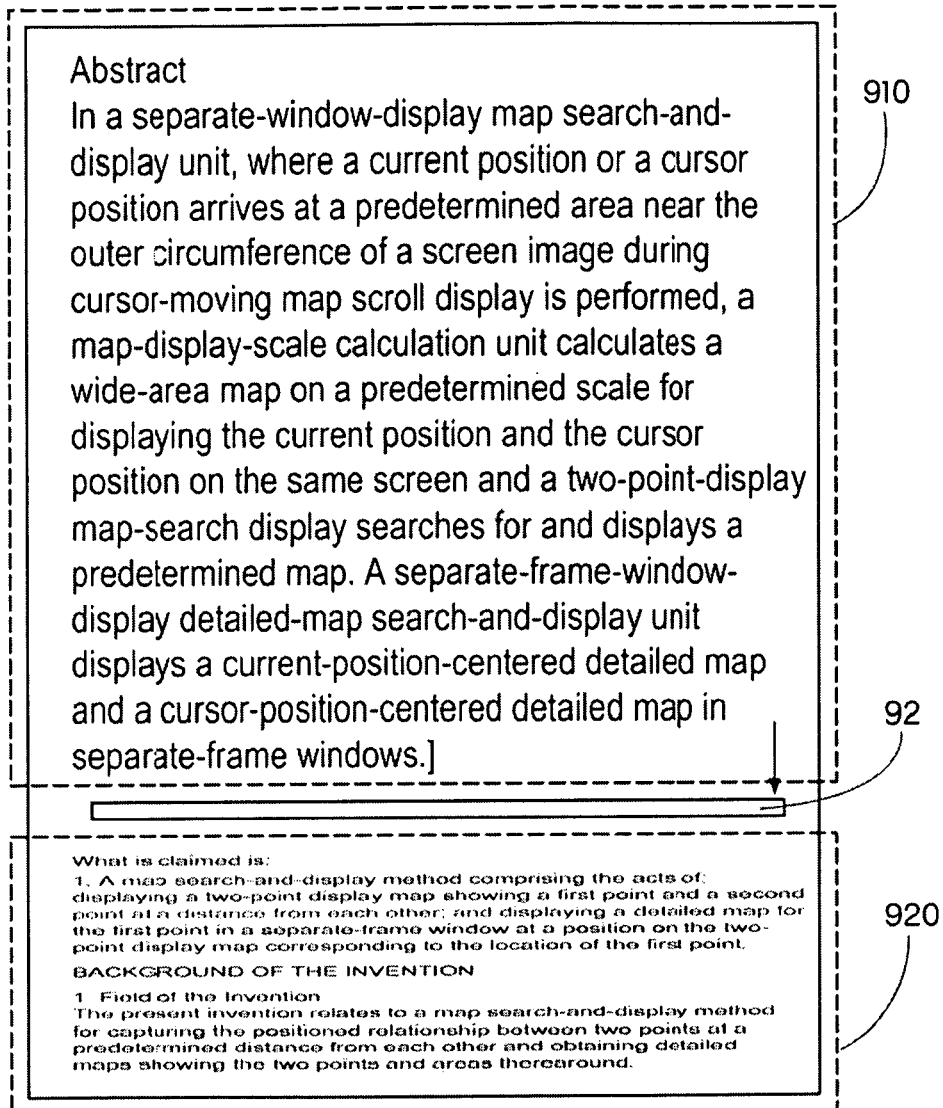

FIG.9 d (500)
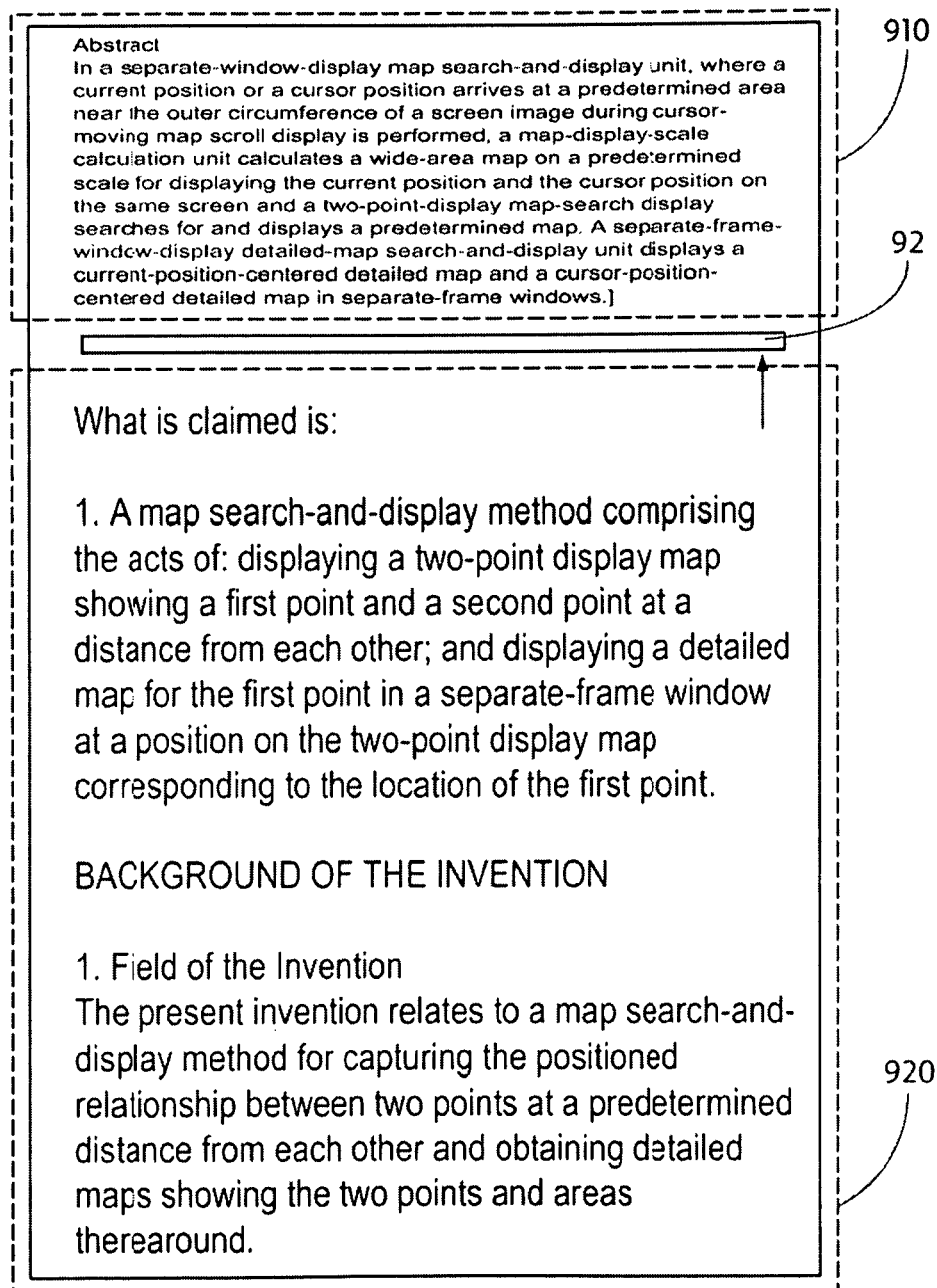

DISPLAY PROCESSING DEVICE AND DISPLAY CONTROL METHOD

BACKGROUND OF THE INVENTION

The present application claims priority to Japanese Patent Application Number 2007-174091, filed Jul. 2, 2007, the entirety of which is hereby incorporated by reference.

1. Field of the Invention

The present invention relates to the display of display objects, such as maps.

2. Description of the Related Art

The display of display objects such as maps using a navigation device installed in an automobile, wherein the map is displayed such that the scale of the map is increased the closer the vehicle is to one or more particular points (e.g. the current position, destination, or the like, as described in Japanese Unexamined Patent Application Publication No. 09-210703 and Japanese Unexamined Patent Application Publication No. 08-328467), is known in the art.

When a map is displayed such that the scale is increased the closer the vehicle is to one or more particular points, the map around one or more particular points can be displayed in detail while simultaneously displaying a wide-area map.

However, with this arrangement, if the user scrolls the map to confirm a region around the area currently displayed, or if the user enlarges the relevant region in order to confirm details of the region currently displayed, a part of the map which had been displayed is no longer displayed, and the user is no longer able to understand the relationship between the portion of the region which is no longer displayed, and the region which is newly displayed or enlarged. Also, in conventional systems, operations for re-displaying and/or using the portion of the region that is no longer displayed are troublesome.

SUMMARY OF THE INVENTION

Accordingly, it is an object of the present invention to enable the user to easily enlarge a display range of a display object displayed on a screen of a display window, or to enlarge a part of a display object displayed on a screen of a display window, while maintaining the range of display for the display object that is currently displayed in the display window.

According to a first aspect of the present invention, a display processing device for displaying a display object in a display window includes: a section setting unit configured to set a plurality of sections for a display window by dividing the display window into a plurality of sections, and setting a boundary between adjacent sections; and a boundary moving unit configured to accept moving operations for a selected boundary, and moving and selected boundary.

The display processing device may also include a section display range changing unit configured to change a display range for a portion of a display object to be displayed in a section bordering said selected boundary. The display range may be changed for each section bordering the selected boundary by an amount corresponding to a change in display size due to the movement of the selected boundary. The display range may be changed by increasing the display range in a section bordering the selected boundary that has increased in display size due to the movement of the selected boundary. The display range may also be changed by decreasing the display range in a section bordering the selected boundary that has decreased in display size due to the movement of the selected boundary. Preferably a display range for a portion of an object to be displayed in each section that does not border said selected boundary remains unchanged when the display range is changed for each section that borders the selected boundary.

A section display scale changing unit configured to change a display scale for each section in the plurality of sections that borders said selected boundary may also be included in the display processing device. The display scale may be changed such that the display scale of a section bordering the selected boundary is changed by an amount corresponding to the change in size of the section bordering the selected boundary after the selected boundary is moved.

With such a display processing device, the display range may be enlarged for a portion of the display object being displayed using a simple operation of moving the boundary of a section that has been set. At this time, the portion of the display object that is displayed in each section of the display window that had been displayed up to this point continues to be displayed, although in a reduced manner, thereby allowing the user to understand the relationship between each section and the newly-displayed enlarged display object range of the display window.

According to a second aspect of the present invention, a display processing device for displaying a display object in a display window, includes a section setting unit configured to set a plurality of sections for a display window by dividing the display window into a plurality of sections, and setting a boundary between adjacent sections; and a boundary moving unit configured to accept moving operations for a selected boundary, and move the selected boundary.

The display processing device may also include a section display scale changing unit configured to change a display scale of a display range for a portion of the display object to be displayed in a section bordering the selected boundary. The display scale may be changed for each section in the plurality of sections by an amount corresponding to a change in a display size due to the movement of the selected boundary. The display scale may be increased in a section bordering the selected boundary that has increased in display size due to the movement of the selected boundary, and the display scale may be decreased in a section bordering the selected boundary that has decreased in display size due to the movement of the selected boundary. Preferably, the display range for each of the sections bordering the selected boundary remains unchanged when the display scale is changed.

With such a display processing device, a portion of the display object being displayed may be enlarged using a simple operation of moving the boundary of a section that has been set. At this time, the portion of the display object that is displayed in each section of the display window that had been displayed up to this point continues to be displayed, although in a reduced form, thereby allowing the user understand the relationship between each section and the enlarged display object portion from the display on the display window.

In these embodiments, the display object may be a map. Also, the display object may be a document. In the case where the display object is a document, the window may be sectioned by the section setting unit at a position on the display window specified by a user so that the sections are set in a state where a portion of the document is displayed in the display window. Further, the display object may be a hierarchical menu having an array of hierarchical level display regions including items of respective hierarchical levels that correspond to each hierarchical level. In this case a portion of the hierarchical menu is displayed in the display window, and sections having as the boundary thereof a border of the hierarchical display regions specified by a user may be set by the section setting unit.

Also, such a display processing device can be applied to a navigation device installed in an automobile or the like. For example, a navigation device may include a display processing device for which the display object is a map. The navigation device may also include a current position calculating unit for calculating a current position of a vehicle, a current position display unit for displaying a mark representing the current position of the vehicle on a map displayed in a display window, and a scrolling unit for moving the range of the map displayed on the entirely of the display window in accordance with the movement of the current position of the vehicle.

According to a third aspect of the present invention, a display processing device for displaying a text string in a display window, includes a section setting unit configured to section a display window at a position specified by a user, so as to divide the display window into a first section disposed toward a leading side of the text string, and a second section disposed toward a trailing side of the text string, wherein the display window is sectioned in a state where at least a portion of the leading side of the text string is displayed in the display window.

The display processing device may also include a boundary moving unit configured to accept boundary moving operations for a boundary disposed between the first and second sections, and move the boundary. A display range changing unit may be included, wherein the display range changing unit is configured to change a display range for the first and second sections if the boundary between the first and second sections is moved in a direction toward the leading side of the text string, such that a portion of the text string displayed in the first section is displayed in a reduced display range, and a second portion of the text string following the first portion is displayed in an increased display range that results in an increased number of characters being displayed in the second section.

The display processing device may further include a display scale changing unit configured to change a display scale for the first and second sections if the boundary between the first and second sections has been moved in a direction toward the trailing side of the text string. In this case, the portion of the text string being displayed in the first section prior to the movement of the boundary is displayed in an increased display scale, and the portion of the text string being displayed in the second section prior to the movement of the boundary is displayed in a reduced display scale.

With such a display processing device, in a case wherein the display window is small, and only the leading portion of the text string can be displayed in the default configuration, the user can easily display portions of the text string portions that are not originally displayed to confirm the contents thereof, or enlarge a portion of the displayed text string to confirm the contents thereof.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

BRIEF DESCRIPTION OF THE DRAWINGS

FIG. 5 is a diagram of a drawing control process according to an embodiment of the present invention;

FIG. 7 is a diagram of a drawing control process according to an embodiment of the present invention;

FIG. 9 is a diagram of a drawing control process according to an embodiment of the present invention;

DESCRIPTION OF THE PREFERRED EMBODIMENTS

Figure 1:
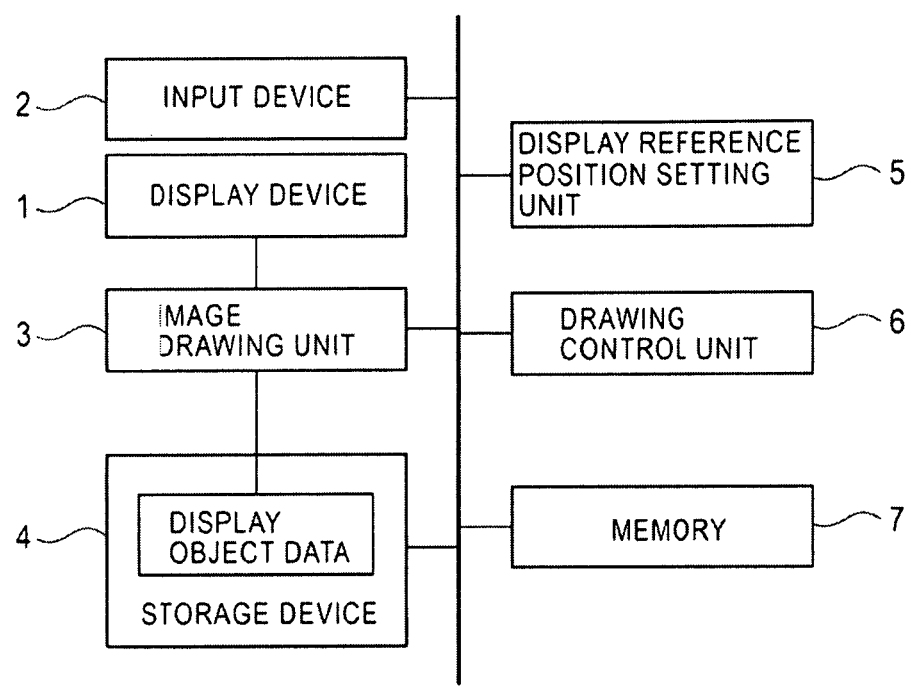
FIG. 1 is a block diagram of a display processing device according to an embodiment of the present invention.

An embodiment of the present invention will be described below. FIG. 1 illustrates the configuration of a display processing system according to an embodiment of the present invention.

As shown in FIG. 1, the display processing system includes a display device 1, such as a LCD or the like, an input device 2 which is a touch panel disposed upon the display screen of the display device 1, an image drawing unit 3 for drawing images to be displayed on the display device 1, a storage device, a display reference position setting unit 5, a drawing control unit 6, and a memory 7. The storage device 4 stores display object data specified display objects such as for a map or the like, and the image drawing unit 3 draws the display objects specified by the display object data, and displays the specified display objects on the display device 1 in a format controlled by the drawing control unit 6.

Note that the display processing system may be implemented using hardware, such as a computer having a general configuration including a microprocessor, memory, and peripheral devices such as a graphic processor or the like. In this case, the above described configuration may be implemented using a microprocessor that executes programs prepared beforehand. In this case, such programs may be provided to the microprocessor by recording media or a suitable communication path.

A drawing control process by which the drawing control unit 6 controls the drawing of a display object on the display device 1 with the image drawing unit 3 will now be described.

Figure 2:
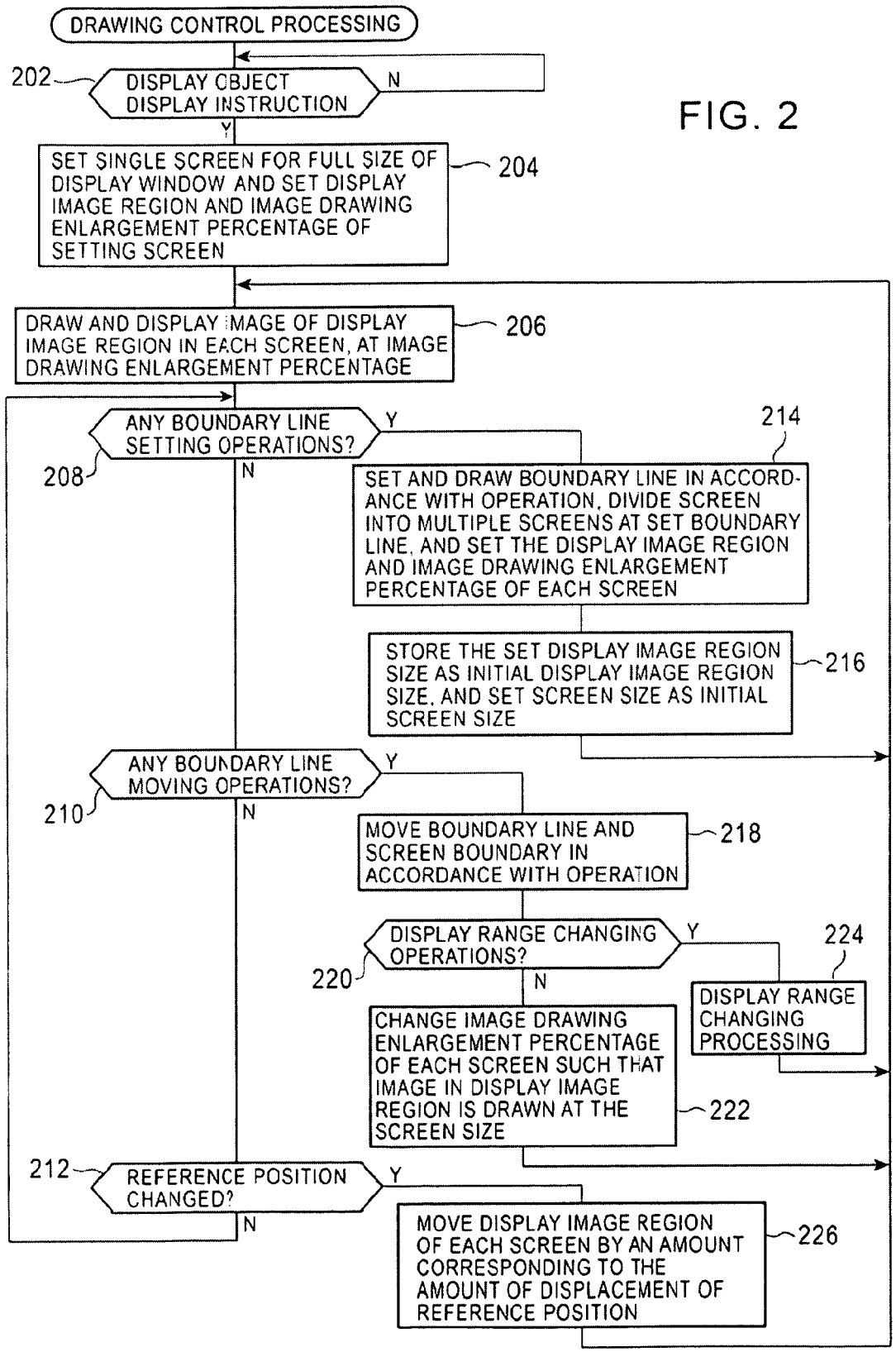
FIG. 2 is a flowchart of a drawing control process according to an embodiment of the present invention.

As shown in FIG. 2, upon display of display object data being instructed (step S202), in step S204, first, a single screen having the full size of the display window is set as the display window in the display screen of the display device 1 in which to display the display object. The scale of the display object to be displayed on the screen is set as the image drawing enlargement percentage of the display screen, and the portion of the display object to be displayed in the display window in the display screen is set as a display image region.

Turning to the display image region of the single screen set in step S204, the portion of the display object located within the display image region is set such that the image drawn at an image drawing scale that is set when the single screen and display image region are set in step S204, and the size of the display image region matches the size of the screen. Additionally, with regard to the position of the display image region, a reference position that is set by the display reference position setting unit 5 is determined as a reference.

That is to say, in the event that the display processing device is a navigation device installed in an automobile, for example, and the display object data is a map specified by the display object data, the display reference position setting unit 5 sets a position on the map corresponding to the current position calculated for a vehicle as a reference. As shown in (a) of FIG. 4, the drawing control unit 6 sets the display image region 40 such that the current position 100 is a vertical/horizontal position which is 1/n of the vertical direction of the display image as measured in a vertically upward direction from the lower side of the display image region 40.

Returning to FIG. 2, once the screen, the screen display image region, and the image drawing enlargement percentage have been set (step S204), the image drawing unit 3 draws and displays the portion of the display object to be displayed on the display image region of each screen at the scale indicated by the image drawing enlargement percentage for each screen set in the display window (step 206).

Figure 4:
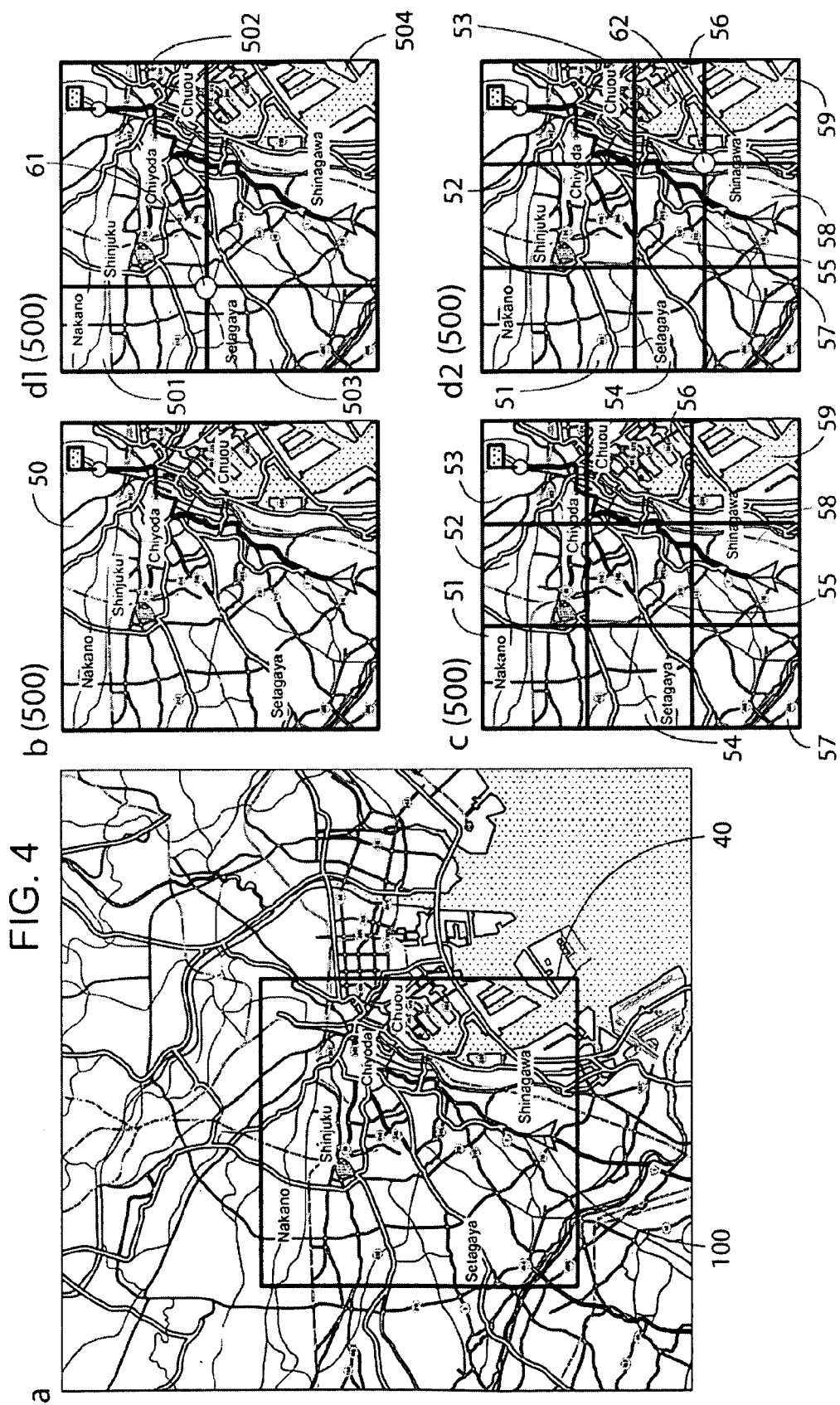
FIG. 4 is a diagram of a drawing control process according to an embodiment of the present invention.

Consequently, in the event that the display image region 40 is set on the single screen on the display window shown in (a) of FIG. 4, the map within the display image region 40 is drawn and displayed on the single screen in the display window 500, as shown in (b) of FIG. 4 (step S206). In the event that the display processing device is a navigation device installed in an automobile, for example, the drawing control unit 6 causes the image drawing unit 3 to draw the current position, destination, and a path to the destination, on the map displayed on the display window 500, as shown in (b) of FIG. 4.

Returning to FIG. 2, once the image drawing unit 3 draws and displays each screen (step S206), the system monitors for boundary line setting operations (step S208), boundary line moving operations (step S210), and changes in the reference position of display object set by the display reference position setting unit 5 (step S212).

In the event a user operation for setting a boundary line is received (step S208), a boundary line is set in accordance with the operation, and the image drawing unit 3 draws the set boundary line in the display window 500. The single screen, as shown in (a) of FIG. 4, is divided at the set boundary line, and the display image region and image drawing enlargement percentage are set for each divided screen (step S214).

An arrangement may be made for this boundary line setting wherein, as shown in (c) of FIG. 4, for example, the boundary lines may be set at predetermined positions in the display window 500 (e.g. the straight lines in the display window 500).

Also, an arrangement may be made wherein two straight lines, one extending in the horizontal direction and the other extending in the vertical direction, intersecting at a point 61 in the display window 500 as shown in (d1) of FIG. 4, may be set as boundary lines by way of a user input through the input device 2. Note that in this case, if another point 62 is specified by the user in the display window 500, as shown in (d2) of FIG. 4, two straight lines, one extending in the horizontal direction and the other extending in the vertical direction, which intersect at the point 62, are set as boundary lines. The original screen 50 from which these screens were divided is then erased.

Now, as shown in (d1) of FIG. 4, upon the boundary lines in the vertical and horizontal directions having been set, four screens 501 through 504 are set. In the event that four boundary lines, two in the vertical and two in the horizontal directions, are set, as shown in (c) of FIG. 4, the screen 50 is divided into nine screens, and screens 51 through 59 are set, as shown in (c) of FIG. 4. Also, in a state wherein four screens 501 through 504 are set as shown in (d1) of FIG. 4, once a second set of boundary lines in the vertical and horizontal directions are set, the screen 50 is divided into 9 screens (sections), and the nine screens 51 through 59 are set, as shown in (d2) of FIG. 4. The original screens 501 through 504 from which these screens were divided are then erased.

The process of setting the display image region and image drawing enlargement percentage of the screens 51 through 59 is set as follows.

At the time the screen is set, the portion of the display object which had been displayed within the region of the display window 500 where the relevant screen had been set is set as the display image region for the relevant screen, and the display scale is set as the image drawing enlargement percentage for the relevant screen. The display scale is preferably set at the time the relevant screen was set.

Returning to FIG. 2, upon setting the boundary lines, the screens divided by the boundary lines, the display image region, the image drawing enlargement percentage of each of the screens (step S214), and the size of the display image region set for the relevant screen are stored in the memory 7 as the initial display image region size. The size of the relevant screen is also stored in the memory 7 as the initial screen size (step S216).

Returning to step S206, the image drawing unit 3 draws and displays the portion of the display object at the enlargement percentage for the screen for each screen that is set in the display window 500. The process then returns to the monitoring steps S208, S210, and S212.

Next, in step S210 in the event that a boundary line moving operation has been detected, the image drawing unit 3 moves the boundary line in the display window 500 in accordance with the operation, and the boundary of the screen that was located on the boundary line that was moved, is moved along with the boundary line that was moved, such that the relevant boundary of the screen is situated on the relevant (moved) boundary line requested by the user operation (Step S218).

Note that the boundary line moving operation is accepted by a user selecting (using a pointing operation) and dragging the boundary line using the input device 2.

That is to say, in a case wherein a total of four boundary lines, two horizontal and two vertical, and the nine screens 51 through 59 sectioned by these boundary lines are set on the display window 500, as shown in (a1) of FIG. 5, if the user selects and drags a position 63, which is not an intersection of the boundary lines, as shown in (a2)-(a4) of FIG. 5, the boundary line selected by the pointing operation is moved to the position to which it was dragged, and the display image regions 41 through 49 shown in (b1) of FIG. 5 are each set as the display objects to be displayed in the relevant screen. Note that if the boundary line to be moved is a horizontally extending boundary line, the boundary line is moved in the vertical direction to the vertical position to which the boundary line was dragged. If the boundary line to be moved is a vertically extending boundary line, the boundary line is moved in the horizontal direction to the horizontal position to which the boundary line was dragged.

Figure 6:
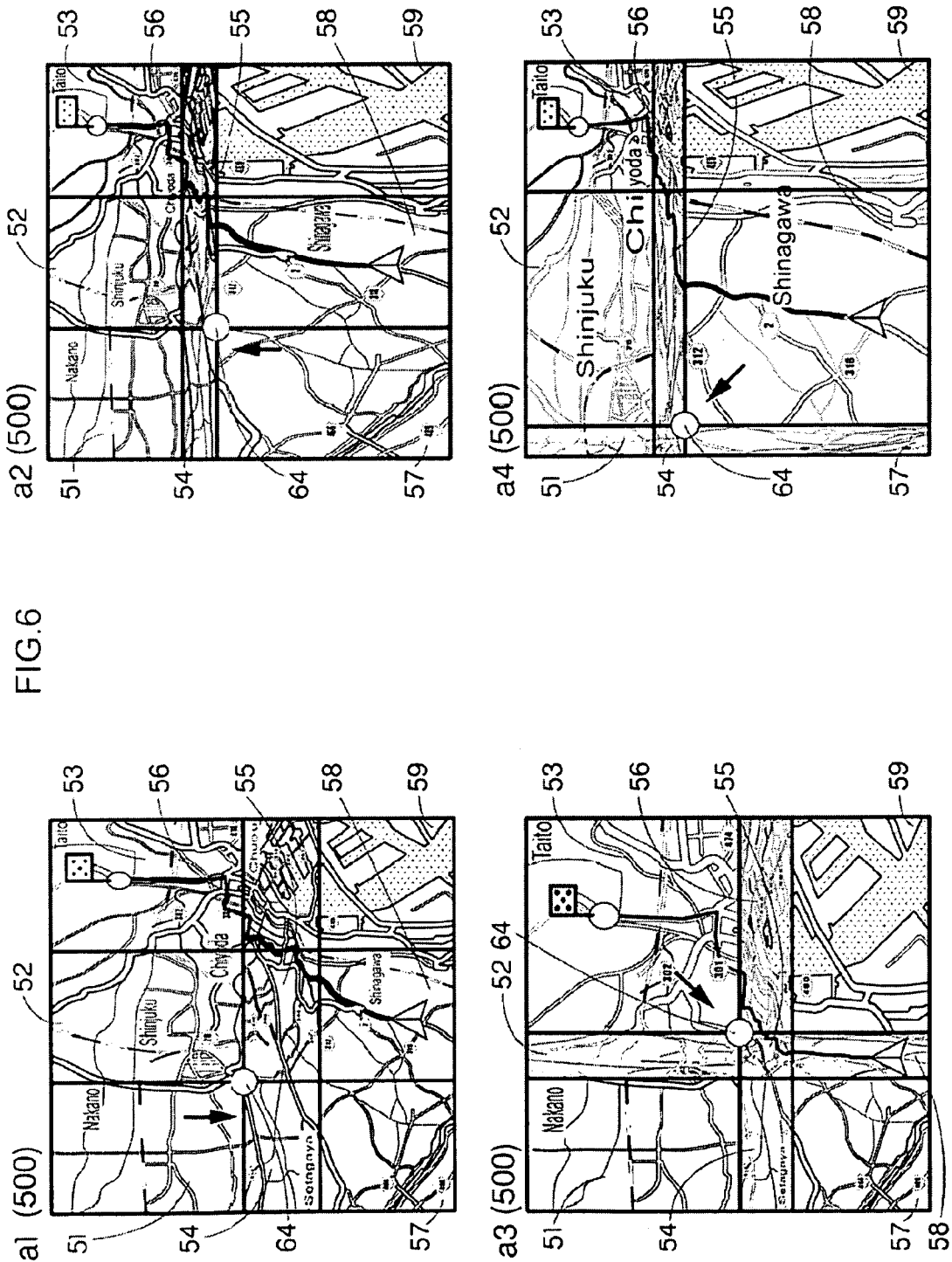
FIG. 6 is a diagram of a drawing control process according to an embodiment of the present invention.

Also, in a case wherein boundary lines and screens 51 through 59 are set as shown in (a1) of FIG. 5, if the user has selected and dragged an intersection 64 of the horizontal and vertical boundary lines using the input device 2, as shown in (a1)-(a4) of FIGS. 6, the two boundary lines intersecting at the selected intersection are moved to the position to which they are dragged. Note that of the two boundary lines, movement of the horizontally extending boundary line is performed by moving the boundary line in the vertical direction to the vertical position to which the boundary line was dragged, while movement of the vertically extending boundary line is performed by moving the boundary line in the horizontal direction to the horizontal position to which the boundary line was dragged. Also, it should be noted that operations wherein one boundary line traverses another boundary line are preferably not acceptable boundary line moving operations.

Returning to FIG. 2, upon having moved the boundary lines, a determination is made as to whether or not the boundary line moving operation which has occurred corresponds to a display range changing operation (step S220). As shown in (a2)-(a4) of FIG. 5, in the event that the boundary line moving operation involves the selecting and dragging of a point which is not an intersection of boundary lines, the operation is determined to be a display range changing operation. In the event that the boundary line moving operation involves the selecting and dragging of a point which is an intersection of boundary lines, as shown in (a1)-(a4) of FIG. 6, the operation is determined to be an enlargement percentage changing operation, and not a display range changing operation.

If the boundary line moving operation is determined to be a display range changing operation, the display range changing operations (described in detail below) are carried out (step S224), and the display image region of each screen is changed. The process then returns to step S206. The image drawing unit 3 then draws and displays the portion of the display objects being displayed in the display image region of each screen set in the display window 500 at the original scale (image drawing enlargement percentage) for each screen. The process then returns to the monitoring steps S208, S210, and S212.

On the other hand, in the event that the boundary line moving operation is determined to be an enlargement percentage changing operation (step S220), the image drawing enlargement percentage for each screen is changed such that the scale of the display object drawn in the relevant screen is increased such that it matches the increased size of the relevant screen after the boundary line has been moved (step S222). The process then returns to step S206 and the image drawing unit 3 draws and displays the portion of the display object shown in the display image region of each screen set in the display window 500, in a reduced scale manner determined by the image drawing enlargement percentage of each screen. The process then returns to the monitoring steps of S208, S210, and S212.

Consequently, in a state wherein a total of four boundary lines, two horizontal and two vertical, the nine screens 51 through 59 sectioned by these boundary lines are set on the display window 500, as shown in (a1) of (a1) of FIG. 5. The map display image regions 41 through 49 shown in (b1) of FIG. 5, which are display objects, are each set in the respective screens 51 through 59. In the event that the user selects and drags a point 64, which is an intersection of the boundary lines, as shown in (a1)-(a4) of FIG. 6, the boundary lines that intersect at the point 64 are moved in accordance with the user operation. At this time, the boundary lines of the portion of the map displayed in each screen section by do not change, but the scale of the portions of the map displayed in each screen change in accordance with the size of the screen such that the greater the screen size is the greater the scale is, and conversely, the smaller the screen size, the small the scale is, so that the entire display image range may be displayed on the screen.

In the event that the user has moved the boundary lines from the state shown in (a1) of FIG. 5 to the state shown in (a4) of FIG. 6, the screen 51 is reduced in the horizontal direction, so that the portion 41 of the map which had been displayed on the screen 51 in a1 of FIG. 5 is displayed in the screen 51 shown in (a4) of FIG. 6 with the horizontal-direction scale reduced in the horizontal direction. In the same way, the screen 52 is enlarged in the horizontal direction, so that the portion 42 of the map that had been displayed on the screen 52 in (a1) of FIG. 5 is displayed in the screen 52 shown in (a4) of FIG. 6, with the horizontal-direction scale enlarged in the horizontal direction. Further, it should be noted that because the screen 53 is not affected by the movement of the boundary line in either the horizontal direction or vertical direction, the portion 43 of the map displayed on the screen 53 in (a1) of FIG. 5 is displayed as shown in (a4) of FIG. 6 with the scale unchanged.

In this example, the screen 54 is also reduced in the horizontal and vertical directions, so that the portion 44 of the map that had been displayed on the screen 54 in (a1) of FIG. 5, is displayed in the screen 54 with the horizontal and vertical direction scale reduced, as shown in (a4) of FIG. 6. The screen 55 is enlarged in the horizontal direction and reduced in the vertical direction, so that the portion 45 of the map which had been displayed on the screen 55 in (a1) of FIG. 5 is displayed in the screen 55 with the scale enlarged in the horizontal direction and reduced in the vertical direction, as shown in (a4) of FIG. 6. Further, the screen 56 is reduced in the vertical direction, so that the portion 46 of the map which had been displayed on the screen 56 in (a1) of FIG. 5 is displayed on the screen 56 with the scale reduced in the vertical direction, as shown in (a4) of FIG. 6.

The screen 57 is reduced in the horizontal direction and enlarged in the vertical direction, so that the portion 47 of the map which had been displayed on the screen 57 in (a1) of FIG. 5 is displayed in the screen 57 with the scale reduced in the horizontal direction and enlarged in the vertical direction, as shown in (a4) of FIG. 6. Also, the screen 58 is enlarged in the horizontal and vertical directions, so that the portion 48 of the map which had been displayed on the screen 58 in (a1) of FIG. 5 is displayed with the scale enlarged in the horizontal and vertical direction, as shown in (a4) of FIG. 6. Further, the screen 59 is enlarged in the vertical direction, such that the portion 49 of the map that had been displayed on the screen 59 in (a1) of FIG. 5 is displayed with the scale enlarged in the vertical direction in the screen 59, as shown in (a4) of FIG. 6.

Accordingly, the user can enlarge the map in a region sectioned by boundary lines without changing the range of the map displayed in the display window 500 as a whole, by performing the simple operation of moving the boundary line.

Returning to FIG. 2, in the event that there is change in the reference position of the display object set by the display reference position setting unit 5 (step S212), the display image region of each screen is moved by the amount that the reference position is displaced (step S226). The process then returns to step S206, where the image drawing unit 3 draws and displays the portion of the display object shown in the display image region of each screen at the scale indicated by the image drawing enlargement percentage of each screen for each screen set in the display window 500, and the flow returns to the monitoring steps S208, S210, and S212.

Consequently, in the event that this embodiment is implemented in a navigation device installed in an automobile and a position on the map which corresponds to the calculated current position of the automobile is set as the reference position, the region of the map displayed in the window 500 also changes as the current position of the automobile moves.

That is to say, for example, in a case wherein the nine screens 51 through 59 sectioned by the boundary lines, as shown in (a1) of FIG. 7, are set in the display window 500, and the display image regions 41 through 49 are set in the screens 51 through 59 respectively, as shown in (b1) of FIG. 7, if the current position of the vehicle 100 (the reference position) moves from the position shown in (b1) of FIG. 7 to the position shown in (b2) of FIG. 7, the display image regions 41 through 49 set in the screens 51 through 59 also move along with the movement of the current position of the vehicle 100, as shown in (b2) of FIG. 7. This movement is performed without changing the size of the display image region as the display of the display window 500 changes from that shown in (a1) of FIG. 7 to that shown in (a2) of FIG. 7. It should be noted that at this time the image drawing enlargement percentage of the screens remains the same, and is not changed. Accordingly, the overall map region displayed on the window 500 changes as the current position 100 moves.

Figure 3:
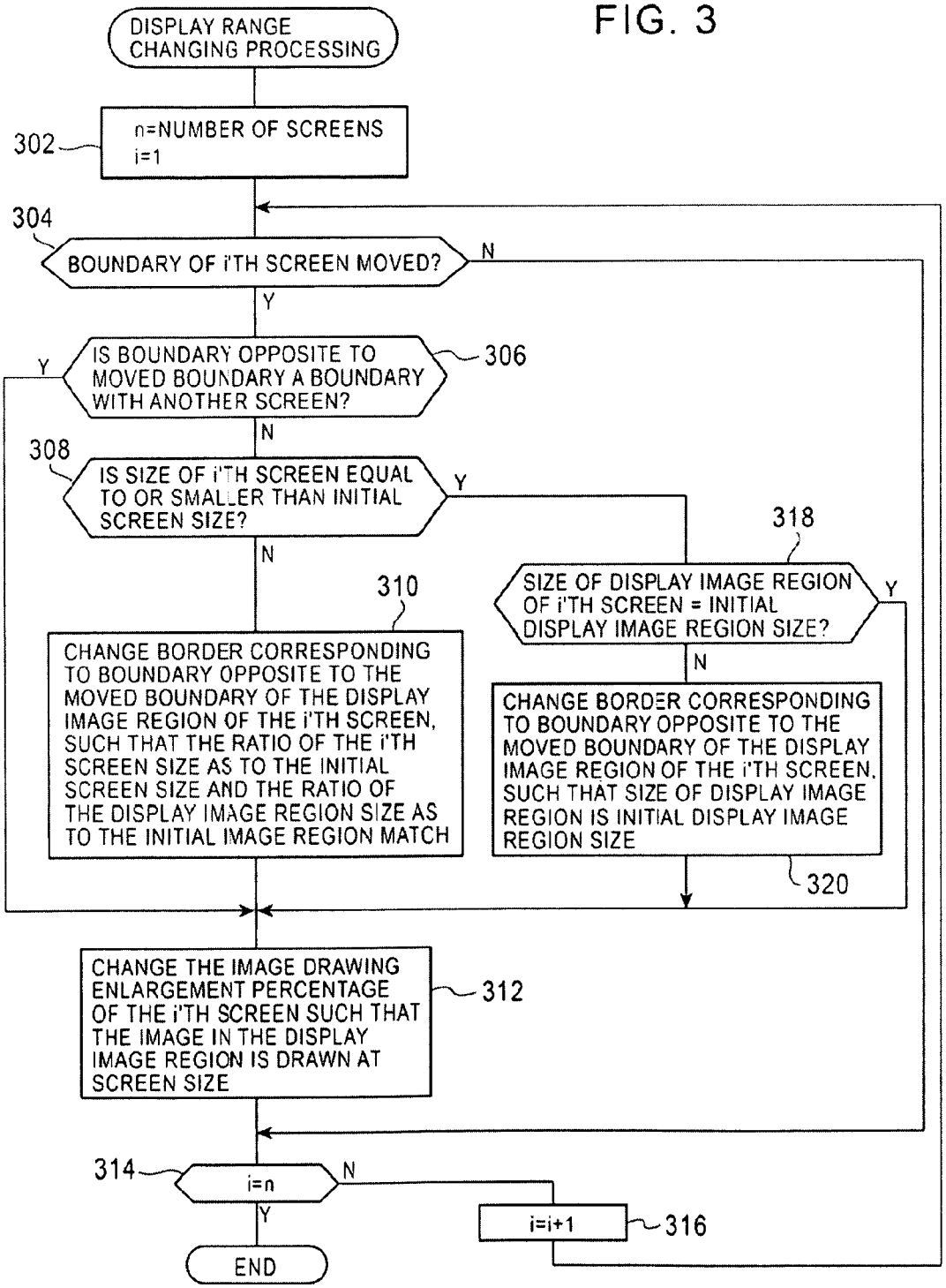
FIG. 3 is a flowchart of a display range change process according to an embodiment of the present invention.

The display range changing process performed in the above-described step S224 will be described next. Referring to FIG. 3, the following processing is performed for each screen that has been set as described above in conjunction with steps S302, S314, and S316.

Initially, the system checks whether or not the boundary of the screen has been moved by boundary moving operations (step S304). In the event that the boundary of the screen has not been moved, the process ends for the relevant screen.

On the other hand, in the event that the boundary of the screen has been moved by boundary moving operations (step S304), the system checks whether or not the boundary on the other side of the moved boundary is a boundary of another screen (step S306). If the moved boundary is a boundary of another screen, the image drawing enlargement percentage of the screen is changed such that an image drawn for the display object to be displayed in the display image region of the relevant screen matches the size of the relevant screen after the boundary is moved (step S312), and the process ends for the relevant screen. Note that "the boundary on the other side of the moved boundary" is, in the case of moving the right boundary, the left boundary; in the case of moving the left boundary, the right boundary; in the case of moving the upper boundary, the lower boundary; and in the case of moving the lower boundary, the upper boundary.

On the other hand, in the event that the boundary on the other side of the moved boundary is not a boundary of another screen (step S306), that is to say, the boundary disposed on the opposite side of screen from the boundary that was moved, is a boundary at the edge portion of the window 500 (step S306), the border corresponding to the boundary on the opposite side from the moved boundary is then changed such that the size of the display image region is the same as the initial display image region size that is stored in the memory 7 (steps S318 and S320). Further, whether the size of the screen after the boundary is moved is equal to or smaller than the initial screen size stored in the memory 7 (step S308), or if the size of the screen is equal to or smaller than the initial screen size, the border corresponding to the boundary on the opposite side from the moved boundary is changed such that the size of the display image region is the same as the initial display image region size stored in the memory 7 (steps S318 and S320). The image drawing enlargement percentage of the screen is then changed such that the portion of the display object image shown in the display image region of the relevant screen matches the size of the relevant screen (step S312), and the process ends for the relevant screen. Note that the process described in steps S318 and S320 prevents the size of the display image region of the screen from becoming smaller than the size of the display image region set for the relevant screen at the time the screens are set. Due to this process, the portion of the display object displayed on the screen at the time the screens are set always remains in the display of the relevant screen even though the scale thereof may be changed, unless the reference position changes.

On the other hand, in the event that the boundary on the other side of the moved boundary is a boundary at the edge portion of the window 500 (step S306), and the size of the screen after having moved the boundary is greater than the initial screen size stored in the memory 7 (step S308), the boundary disposed at the opposite side of the moved boundary of the display image region is moved such that the ratio of the screen size after the boundary is moved to the initial screen size, and the ratio of the size of the display image region after the boundary is moved to the size of the initial display image region are the same (step S310). That is to say, in the event that the size of the screen after the boundary is moved is greater than the size of the initial screen by d % in the vertical direction, the border corresponding to the boundary on the opposite side of the boundary of the display image region that has been moved is moved vertically such that the size of the display image region is increased by d % from the initial display image region size in the vertical direction.

The image drawing enlargement percentage of the screen is then changed such that the image drawn for the portion of the display object to be displayed in the display image region of the relevant screen is the same size as the size of the relevant screen (step S312), and process ends for the relevant screen.

Upon the user moving the boundary lines from the state shown in (a1) of FIG. 5 to the state shown in (a2)-(a4) in FIG. 5, the display image range of the screen is enlarged so as to be greater than the initial screen size, and the range of the map displayed in the screen is widened due to the movement of the boundary line, as shown in (b2)-(b4) of FIG. 5. Regarding the other screens, the display image range is maintained, and while the range of the map displayed in each screen does not change, the scale (image drawing enlargement percentage) of the portion of the map displayed in each screen is changed so as to be increasingly smaller the smaller the screen size is, such that all of the display image range can be displayed within the screen.

Accordingly, in the event the user moves a boundary line from the state shown in (a1) or (b1) of FIG. 5, to the state shown in (a2) of FIG. 5, the display image regions 41, 42, and 43 of the screens 51, 52, and 53 are enlarged upwards, as shown in (b2) of FIG. 5. Thus, a greater portion of the map that was not displayed in the screens 51, 52, and 53 in (a1) of FIG. 5 may be displayed after the boundary is moved, as shown in the screens 51, 52, and 53 in (a4) of FIG. 6.

On the other hand, the screens 54, 55, and 56 are reduced in the vertical direction, so the portion of the map displayed in the screens 54, 55, and 56 in (a1) of FIG. 5 is displayed in a vertically reduced manner in the screens 54, 55, and 56 shown in (a2) of FIG. 5. In this case, the display screen areas 44, 45, and 46 remain unchanged, as shown in (b2) of FIG. 5.

Also, the screen size for the screens 57, 58, and 59 remains unchanged, and the display range and the image drawing enlargement image percentage for the screens 57, 58, and 59 in (a1) of FIG. 5 are maintained as shown in (a2) of FIG. 5.

Accordingly, by simply moving a boundary line, the user can, confirm the surroundings of the range of the map displayed on the display window 500 by widening the range of the map to be displayed on the display window 500 as a whole, without changing the scale (enlargement percentage) of the relevant surrounding portion.

Note that the above described drawing control process may include operations for moving boundary lines at the intersection 65 wherein the boundary movement operation is accepted as a display range changing operation. In this case, the display range changing process shown in FIG. 3, and described above is applied in both the horizontal and vertical directions.

Thus, in the event that the user has moved the boundary lines from the state shown in (a1) and (b1) of FIG. 5 to the state shown in (c) of FIG. 7, the display image ranges 41 through 49 of the screens 51 through 59 are as shown in (d) of FIG. 7. This configuration enables the display image range of a screen that is in contact with a horizontal direction edge of the display window, which has been enlarged horizontally as compared to the initial screen size by the movement of a boundary, to be enlarged in the horizontal direction into a surrounding portion of the map which had been displayed in the display window. Additionally, this configuration enables the display image range of a screen that is in contact with a vertical direction edge of the display window, which has been enlarged in the vertical direction as compared to the initial screen size by the movement of a boundary, to be enlarged in a vertical direction into a surrounding portion of the map portion which had been displayed in the display window. Note that in this case, the display image range of the screens has not been enlarged in the horizontal-direction beyond the initial screen size, and the screen size is maintained without change in the horizontal direction. Similarly, the display image range of screens for which the screen size has not been enlarged in the vertical-direction beyond the initial screen size is maintained in the vertical direction without change.

This drawing control process may be similarly applied to display of display objects other than image objects such as maps or the like. Examples of this application are described below.

Initially, a first application example will be described wherein the display object which the display object data represents is a document, such as the one shown in (a) of FIG. 8.

Figure 8A:
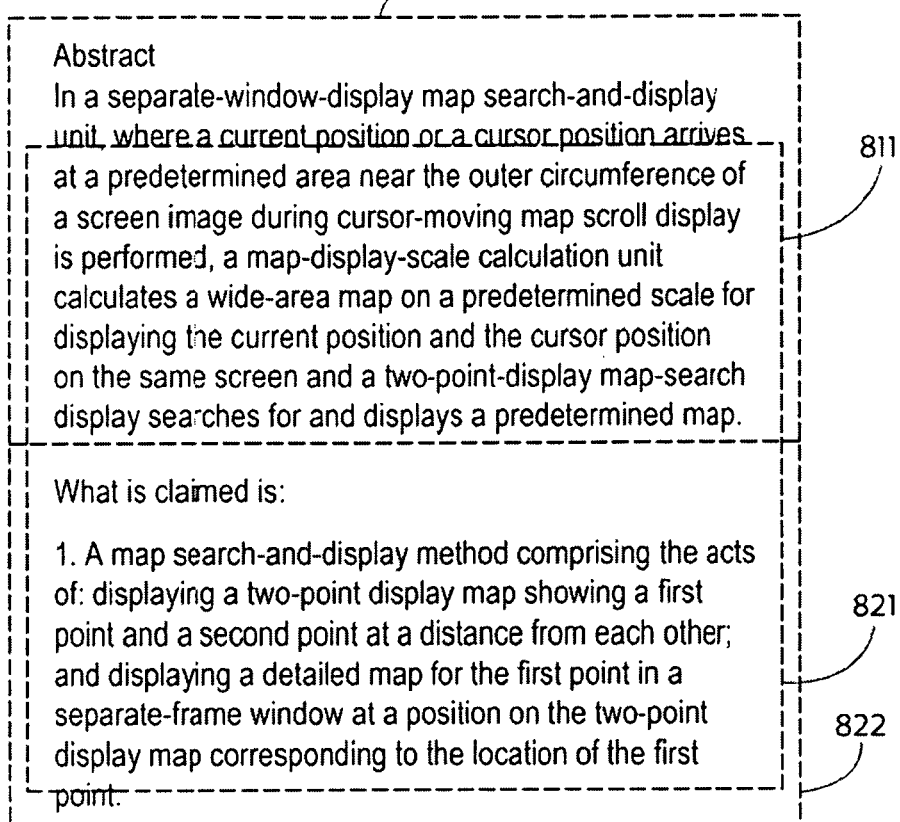
FIG. 8 is a diagram of a drawing control process according to an embodiment of the present invention.

In this case, a part of a document is displayed in the display window 500, as shown in (b) of FIG. 8. In the event that a point 81 in the document is selected by the user as shown in (c) of FIG. 8, the drawing control unit 6 sets a boundary line 82 at the position of the point 81, and sets the area above the boundary line 82 in the display window 500 as a first screen 810 having a display image range denoted by reference numeral 811 in (a) of FIG. 8. The area below the boundary line 82 is set as a second screen 820 having a display image range denoted by reference numeral 821 in (a) of FIG. 8.

If the user moves the boundary line 82 downwards, as shown in (d) of FIG. 8, this operation is accepted as a boundary line moving operation that corresponds to a display range changing operation. In this case, the lower boundary of the first screen 810 is moved downwards as the first screen 810 is enlarged, and the upper boundary of the second screen 820 is moved downwards and the second screen 820 is reduced, such that the boundary between the screens matches the boundary line 82.

The display image range of the first screen 810, in which the screen size has been enlarged so as to be greater than the initial screen size, is enlarged upwards as denoted by reference numeral 812 in (a) of FIG. 8, so as to display a portion disposed upward of the portion of the document originally displayed in the first screen 810. Also, with regard to the second screen 820, for which the screen size has been reduced from the initial screen size, the image enlargement percentage is reduced while maintaining the display image range 821, thus the same portion of the document that was originally shown in the second screen 820 is shown, but in a reduced scale manner. That is to say, the display image range 821 of the document shown in the second screen is left unchanged, but the image enlargement percentage is reduced. It should be noted, however, that the image enlargement percentage may specify the display font size of the document.

In the event that the user moves the boundary line 82 upwards from the state shown in (c) to the state shown in (e) of FIG. 8, this operation is accepted as a boundary line moving operation that corresponds to a display range changing operation, and the lower boundary of the first screen 810 is moved upwards and the size of the first screen 810 is reduced. In this case, the upper boundary of the second screen 820 is moved upwards and the size of the second screen 820 is enlarged, such that the boundary between the screens matches the boundary line 82.

The display image range of the second screen 820, which is denoted by reference numeral 822 in FIG. 8, is enlarged downwards so as to display a portion of the document disposed below the portion shown in the second screen 820 prior to the boundary being moved. Also, with regard to the first screen 810 whose screen size has been reduced from the initial screen size, the image enlargement percentage is reduced while maintaining the display image range 811, thus the portion of the document originally shown in the first screen 810 remains the same, but is shown in a reduced scale manner.

Next, another embodiment will be described, wherein the display object data represents is a document.

In this case, in a state where a part of a document is displayed in the display window 500, as shown in (a) of FIG. 9, in the event that a point 91 in the document is selected by the user, as shown in (b) of FIG. 9, the drawing control unit 6 sets a boundary line 92 at the position of the point 91. The area above the boundary line 92 in the display window 500 is then set as a first screen 910 having a display image range denoted by reference numeral 911 in (b) of FIG. 9, and the area below the boundary line 92 is set as a second screen 920 having a display image range denoted by reference numeral 912 in (b) of FIG. 9.

Upon the user moving the boundary line 92 in a downward direction, as shown in (c) of FIG. 9, the boundary line moving operation is accepted an enlargement percentage changing operation, and the lower boundary of the first screen 910 is moved downwards thereby enlarging the size of the first screen 910, and the upper boundary of the second screen 920 is moved downwards thereby reducing the size of the second screen 920 such that the boundary between the first and second screens 910, 920 matches the boundary line 92.

The enlargement percentage of the first screen 910 whose screen size has been enlarged is increased, and the portion of the document which had been displayed in the first screen 910 is displayed in the first screen 910 in an enlarged scale manner, as shown in (b) of FIG. 9. Also, the enlargement percentage of the second screen 920 whose screen size has been reduced is lowered, and the portion of the document which had been displayed in the second screen 920 is displayed in the second screen 920 in a reduced scale manner, as shown in (b) of FIG. 9.

Also, upon the user moving the boundary line 92 in an upward direction from the state shown in (b) to the state shown in (d) of FIG. 9, the boundary line moving operation is accepted as an enlargement percentage changing operation, and the lower boundary of the first screen 910 is moved upwards thereby reducing the size of the first screen 910, and the upper boundary of the second screen 920 is moved upwards thereby enlarging the size of the second screen 920 such that the boundary between the first and second screens 910, 920 matches the boundary line 92.

The enlargement percentage of the first screen 910 for which the screen size has been reduced is lowered, and the portion of the document which had been displayed in the first screen 910 is displayed in the first screen 910 in a reduced scale manner, as shown in (b) of FIG. 9. Also, the enlargement percentage of the second screen 920 for which the screen size has been enlarged is increased, and the portion of the document which had been displayed in the second screen 920 is displayed in the second screen 920 in an enlarged scale manner, as shown in (b) of FIG. 9.

Figure 10:
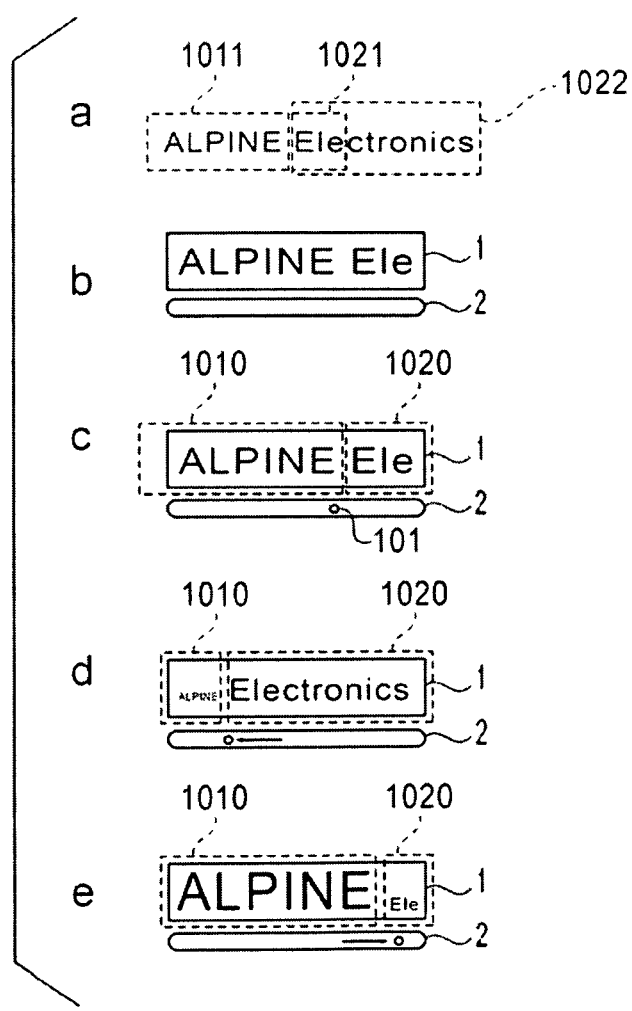
FIG. 10 is a diagram of a drawing control process according to an embodiment of the present invention.

Next, a third embodiment will be described, where the display object is a string of text, as shown in FIG. 10.

In this case, a portion of text is displayed on a display device 1, as shown in (b) of FIG. 10. In the event that a user specifies a point 101 using an input device 2 that accepts horizontal tracing operations provided by the display device 1, the drawing control unit 6 sets an invisible boundary line at a position corresponding to the point 101 on the display screen of the display device 1. The drawing control unit 6 then sets the area located on the left side of the boundary line as a first screen 1010 having a display image range denoted by reference numeral 1011 in (a) of FIG. 10, and sets an area located on the right side of the boundary line as a second screen 1020 having a display range denoted by reference numeral 1021, as shown in (a) of FIG. 10.

Upon the user performing an operation in which the input device 2 is moved in a leftward direction, the operation is accepted as a boundary line moving operation corresponding to a display range changing operation. The boundary line is then moved to the left as shown in (d) of FIG. 10. The right boundary of the first screen 1010 is then moved in a leftward direction, and the size of the first screen 1010 is reduced. Similarly, the left boundary of the second screen 1020 is moved in a leftward direction and the size of the second screen 1020 is enlarged such that the boundary between the first and second screens 1010, 1020 matches the boundary line.

The display image range of the second screen 1020, which has been enlarged such that the screen size is greater than that of the initial screen size, is enlarged in the right direction as denoted by reference numeral 1022 in (a) of FIG. 10, with the text being displayed all the way to the right side of the second screen 1020. Also, the display image range of the first screen 1010, which has been reduced such that the screen size is smaller than that of the initial screen size, is displayed with the image enlargement ratio lowered while maintaining the display image range 1011, such that the portion of the display image range 1011 of the text is displayed in a reduced manner. It should be noted, however, that the image enlargement percentage determines the display font size of the document.

Also, upon the user continuing to trace the input device 2 in a rightward direction from the state in (c) of FIG. 10, this operation is accepted as a boundary line moving operation corresponding to an enlargement percentage changing operation, such that the boundary line is moved to the right as shown in (e) in FIG. 10. The right boundary of the first screen 1010 is moved to the right side and the first screen 1010 is enlarged, and the left boundary of the second screen 1020 is moved to the right side and the second screen 1020 is reduced, such that the boundary between the screens matches the boundary line.

The image enlargement ratio of the first screen 1010 for which the screen size has been enlarged is increased, such that the portion of the display image range 1011 of the text is displayed in an enlarged manner in the first screen 1010. The image enlargement ratio of the second screen 1020 for which the screen size has been reduced is reduced, such that the portion of the text in the display image range 1021 is displayed in a reduced scale manner in the second screen 1020. In this way, a maximum number of characters, and preferably the entirety of the text is shown in the second screen 1020.

Figure 11A:
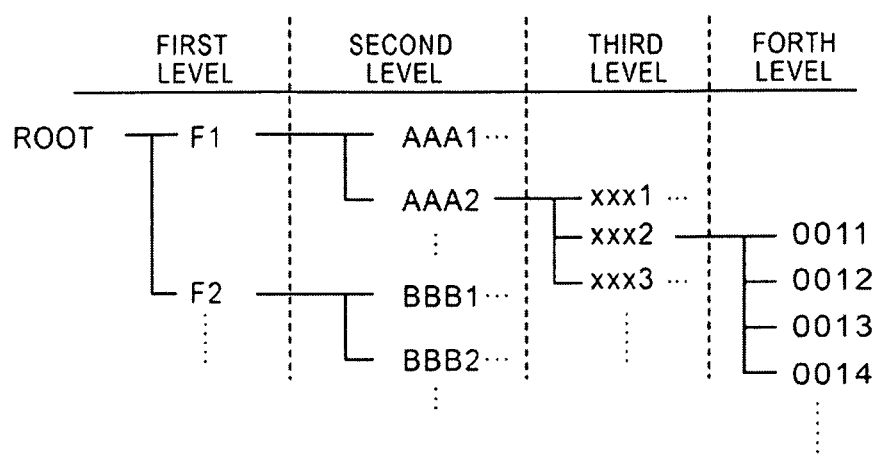
FIGS. 11A and 11B are diagrams of a drawing control process according to an embodiment of the present invention.
Figure 11B:
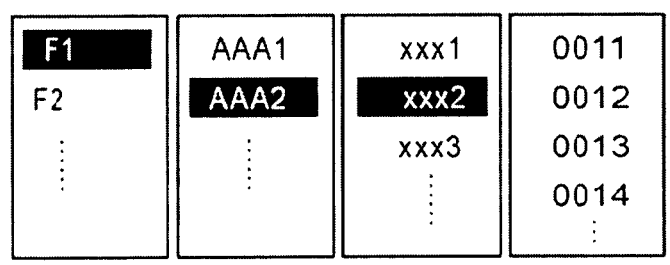

Next, a fourth embodiment will be described, wherein the display object is a hierarchical menu, as shown in FIG. 11B. The hierarchical menu hierarchically represents items on each level having a selected item as a reference. The hierarchical menu also has a tree structure having first through fourth hierarchical levels including multiple items, such as shown in FIG. 11A for example.

Figure 12:
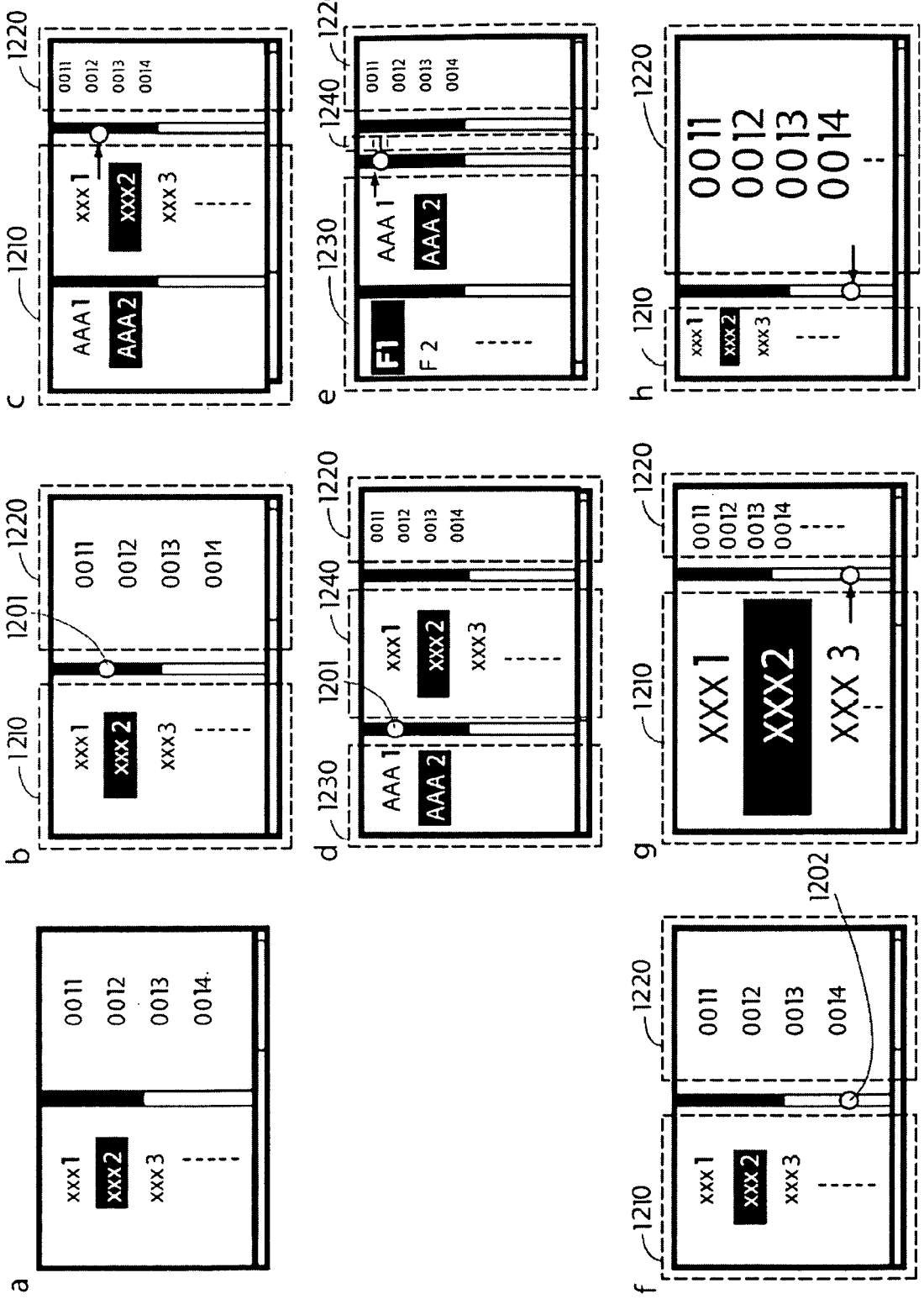
FIG. 12 is a diagram of a drawing control process according to an embodiment of the present invention.

In this case, when a part of the hierarchical menu is displayed on the display window 500, as shown in (a) of FIG. 12, if a user selects a point 1201 located in the filled-in portion of an upper part of the sectioning line located between the display region of the items in the third hierarchical level and the display region of the items in the fourth hierarchical level, an invisible boundary line is set at the specified position on the sectioning line in the display window 500. In this case, the area of the display window 500 that is located on the left side of the boundary line is set as a first screen 1210, and the area located on the right side of the display window 500 is set as a second screen 1220.

As shown in (c) of FIG. 12, in the event that the sectioning line between the display region of the items in the third and fourth hierarchical levels is moved to the right by dragging the filled-in portion at the upper part of the sectioning line, this movement of the sectioning line is accepted as a boundary line moving operation corresponding to a display range changing operation for the boundary line being moved along with the sectioning line. In this case, the right boundary of the first screen 1210 is moved to the right, thereby enlarging the size of the first screen 1210, and the left boundary of the second screen 1220 is moved to the right, thereby reducing the size of the second screen 1220 such that the boundary between the first and second screens 1210, 1220 matches the boundary line.

The minimum size of the display region of the first level in the horizontal direction is "d," and the maximum value of the display region of the first level is "n," wherein "nd" is less than or equal to the horizontal direction size of the fist screen 1210. After the screen size has been enlarged, "nd" is obtained as the number of hierarchical levels which can be displayed in the first screen 1210, and a display region for m−n levels of items (where m is the number of levels currently displayed in the first screen 1210) is provided in the first screen 1210, and the display image region of m levels is enlarged in the left direction.

In this case, m−n=1, and as the display image range of the first screen 1210 is enlarged in the left direction by one level as shown in (c) of FIG. 12, a display region is provided in the first screen 1210 for displaying items of the second level. On the other hand, the image enlargement percentage is reduced while maintaining the display image range, with the items of the fourth level being displayed in a reduced manner for the second screen 1220, which has been reduced in screen size as compared to the initial screen size. It should be noted, however, that the image enlargement percentage determines the display font size of the document.

In this case, in the state shown in (c) of FIG. 12, if the position 1201 in the filled-in portion at the upper part of the sectioning line between the display region of the items of the second level and the display region of the items of the third level is specified, an invisible boundary line is set at the specified position on the sectioning line in the display window 500, such that the first screen 1210 is divided into a third screen 1230 and a fourth screen 1240.

As shown in (e) in FIG. 12, in the event that the sectioning line between the display region of the items of the second level and the display region of the items of the third level are moved to the right by dragging the filled-in portion at the upper part of the sectioning line, this operation is accepted as a boundary line moving operation corresponding to a display range changing operation for the boundary line being moved along with the sectioning line. The right boundary of the third screen 1230 is then moved to the right and the size of the third screen 1230 is enlarged, and the left boundary of the fourth screen 1240 is moved to the right and the size of the fourth screen 1240 is reduced, such that the boundary between the screens matches the moved boundary line.

In this case, the above-described m−n=1 is obtained as to the horizontal direction size of the enlarged third screen 1230, such that the display image range of the third screen 1230 is enlarged in the left direction by one hierarchical level, and as shown in (e) in FIG. 12, a display region is provided in the third screen 1230 for displaying items of the first level. On the other hand, the image enlargement percentage is reduced, while the display image range is maintained, such that the items of the third level are displayed in a reduced scale manner for the fourth screen 1240, the fourth screen having been reduced in size as compared to the initial screen size.

Next, in the state where a part of the hierarchical menu is displayed in the display window 500, as shown in (a) of FIG. 12, in the event a position 1202 in the white portion of the lower part of the sectioning line between the items of the third hierarchical level and the items of the fourth hierarchical level is selected, as shown in (f) in FIG. 12, an unseen boundary line is set at the specified sectioning line in the display window 500, and the area located to the left of the boundary line is set as the first screen 1210, and the area located to the right of the boundary line is set as the second screen 1220.

In the event that the sectioning line between the items of the third hierarchical level and the items of the fourth hierarchical level is moved to the right by dragging the lower white portion, as shown in (g) in FIG. 12, this operation is accepted as a boundary line moving operation corresponding to an enlargement percentage changing operation for the boundary line being moved along with the sectioning line. The right boundary of the first screen 1210 is moved to the right and the size of the first screen 1210 is enlarged, and the left boundary of the second screen 1220 is moved to the right and the size of the second screen 1220 is reduced such that the boundary between the screens matches the boundary line.

The image enlargement ratio of the first screen 1210 for which the screen size has been enlarged is increased, such that the items of each hierarchical level within the first screen 1210 that are displayed in an enlarged scale manner in the first screen 1210, and the image enlargement ratio of the second screen 1220 for the screen that has been reduced in size is reduced such that the items of each hierarchical level within the second screen 1220 are displayed in a reduced scale manner in the second screen 1220 so that the entirety thereof is shown in the second screen 1220. However, it should be noted that the display image range for the first and second screens 1210 and 1220 is not changed.

On the other hand, in the event that the sectioning line between the items of the third hierarchical level and the items of the fourth hierarchical level is being moved to the left by dragging the lower white portion from the state (f) to the state (g) in FIG. 12, this operation is accepted as a boundary line moving operation corresponding to an enlargement percentage changing operation for the boundary line being moved along with the sectioning line. The right boundary of the first screen 1210 is moved to the left and the size of the first screen 1210 is reduced, and the left boundary of the second screen 1220 is moved to the left and the size of the second screen 1220 is enlarged such that the boundary between the screens matches the boundary line.

The image enlargement ratio of the first screen 1210 for which the screen size has been reduced is lowered, and the items of each hierarchical level within the first screen 1210 are displayed in a reduced manner in the first screen 1210, so that the entirety thereof is shown in the first screen 1210. The image enlargement ratio of the second screen 1220 for which the screen size has been enlarged is increased, and the items of each hierarchical level within the second screen 1220 are displayed in an enlarged manner in the second screen 1220. However, it should be noted that the display image range for the first and second screens 1210 and 1220 remain unchanged.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. A display processing device for displaying a display object in a display window, said device comprising:
   a section setting unit configured to set a plurality of sections for a display window by dividing said display window into four or more rectangular sections, and setting a linear boundary between adjacent sections, wherein said boundaries form intersections at one or more points where said boundaries intersect;
   a boundary moving unit configured to accept moving operations for a selected boundary or a selected intersection, and move said selected boundary or said selected intersection, said moving operations defined by dragging said selected boundary or a point corresponding to said selected intersection;
   a section display range changing unit configured to change a display range for a portion of a display object to be displayed in a section bordering said selected boundary, wherein said display range is changed for each section bordering said selected boundary by an amount corresponding to a change in display size due to said movement of said selected boundary, wherein said display range is increased in a section bordering said selected boundary that has increased in display size due to said movement of said selected boundary, and said display range is decreased in a section bordering said selected boundary that has decreased in display size due to said movement of said selected boundary, and wherein a display range for a portion of an object to be displayed in each section that does not border said selected boundary remains unchanged when said display range is changed for each section that borders said selected boundary; and
   a section display scale changing unit configured to change a display scale for each section in said plurality of sections that borders said boundaries forming said selected intersection in response to said movement of said point corresponding to said selected intersection, such that said display scale of a section bordering said boundaries forming said selected intersection is changed by an amount corresponding to said change in size of said section bordering said boundaries forming said selected intersection after said point corresponding to said selected intersection is moved.

2. The display processing device according to claim 1, wherein said display object is a map.

3. The display processing device according to claim 1, further comprising:
- a current position calculating unit configured to calculate a current position of a vehicle;
- a current position display unit configured to display a mark representing said current position of said vehicle on a map displayed on said display window; and
- a scrolling unit configured to move said range of said map displayed on an entirety of said display window according to movement of said current position of said vehicle,
wherein said display object is a map.

4. A display processing device for displaying a display object in a display window, said device comprising:
- a section setting unit configured to set a plurality of sections for a display window by dividing said display window into four or more rectangular sections, and setting a linear boundary between adjacent sections, wherein said boundaries form intersections at one or more points where said boundaries intersect;
- a boundary moving unit configured to accept moving operations for a selected boundary or a selected intersection, and move said selected boundary or said selected intersection, said moving operations defined by dragging said selected boundary or a point corresponding to said selected intersection; and
- a section display scale changing unit configured to change a display scale of a display range for a portion of said display object to be displayed in a section bordering said boundaries forming said selected intersection in response to said movement of said point corresponding to said selected intersection, wherein said display scale is changed for each section in said plurality of sections by an amount corresponding to a change in a display size due to said movement of said point corresponding to said selected intersection, wherein said display scale is increased in a section bordering said boundaries forming said selected intersection that has increased in display size due to said movement of said point corresponding to said selected intersection, and said display scale is decreased in a section bordering said boundaries forming said selected intersection that has decreased in display size due to said movement of said point corresponding to said selected intersection, and wherein said display range for each of said sections bordering said boundaries forming said selected intersection remains unchanged when said display scale is changed.

5. The display processing device according to claim 4, wherein said display object is a map.

6. The display processing device according to claim 4, further comprising:
- a current position calculating unit configured to calculate a current position of a vehicle;
- a current position display unit configured to display a mark representing said current position of said vehicle on a map displayed in said display window; and
- a scrolling unit configured to move said range of said map displayed on an entirety of said display window, in accordance with movement of said current position of said vehicle,
wherein said display object is said map.

7. A display processing device for displaying a text string in a display window, comprising:
- a section setting unit configured to section a display window at a position specified by a user, so as to divide said display window into a first section disposed toward a leading side of said text string, and a second section disposed toward a trailing side of said text string, wherein said display window is sectioned in a state where at least a portion of said leading side of said text string is displayed in said display window;
- a boundary moving unit configured to accept boundary moving operations from an input device that accepts tracing operations for a boundary disposed between said first and second sections, and move said boundary;
- a display range changing unit configured to change a display range for said first and second sections if said boundary is moved in a direction toward said leading side of said text string, such that a portion of said text string displayed in said first section is displayed in a reduced display range, and a second portion of said text string following said first portion is displayed in an increased display range that results in an increased number of characters being displayed in said second section; and
- a display scale changing unit configured to change a display scale for said first and second sections in response to said boundary having been moved in a direction toward said trailing side of said text string, such that said portion of said text string being displayed in said first section prior to said movement of said boundary is displayed at a display scale increased by an amount corresponding to said movement of said boundary, and said portion of said text string being displayed in said second section prior to said movement of said boundary is displayed in a reduced display scale.

8. A display control method for displaying a display object using a display processing device to display an object in a display window, said method comprising:
- dividing a display window, by a processor, into four or more rectangular sections, and setting a linear boundary between adjacent sections, wherein said boundaries form intersections at one or more points where said boundaries intersect;
- accepting a boundary moving operation or an intersection moving operation from a user, said moving operations defined by dragging a boundary or a point corresponding to an intersection;
- moving a selected boundary or a selected intersection;
- changing a display range for a portion of a display object to be displayed in a section bordering said selected boundary, wherein said display range is changed for each section bordering said selected boundary by an amount corresponding to a change in display size due to said movement of said selected boundary, wherein said display range is increased in a section bordering said selected boundary that has increased in display size due to said movement of said selected boundary, and said display range is decreased in a section bordering said selected boundary that has decreased in display size due to said movement of said selected boundary, and wherein a display range for a portion of an object to be displayed in each section that does not border said selected boundary remains unchanged when said display range is changed for each section that borders said selected boundary; and changing a display scale for each section in said plurality of sections that borders said boundaries forming said selected intersection in response to said movement of said point corresponding to said selected intersection, such that said display scale of a section bordering said boundaries forming said selected intersection is changed by an amount corresponding to said change in size of said section bordering said boundaries forming said selected intersection after said point corresponding to said selected intersection is moved.

9. The display control method according to claim 8, wherein said display object is a map.

10. The display control method according to claim 8, further comprising:

calculating a current position of a vehicle;

displaying a mark representing said current position of said vehicle on a map displayed on an entirety of said display window; and moving a range of said map displayed on said entirety of said display window, according to movement of said current position of said vehicle.

11. A display control method for displaying a display object with a display processing device that displays a display object in a display window, said method comprising:

dividing a display window, by a processor, into four or more rectangular sections, and setting a linear boundary between adjacent sections, wherein said boundaries form intersections at one or more points where said boundaries intersect;

accepting a boundary moving operation or an intersection moving operation from a user, said moving operations defined by dragging a boundary or a point corresponding to an intersection;

moving a selected boundary;

changing a display scale of a display range for a portion of said display object to be displayed in a section bordering boundaries forming said selected intersection in response to said movement of said point corresponding to said selected intersection, wherein said display scale is changed for each section in said plurality of sections by an amount corresponding to a change in a display size due to said movement of said point corresponding to said selected intersection, wherein said display scale is increased in a section bordering said boundaries forming said selected intersection that has increased in display size due to said movement of said point corresponding to said selected intersection, and said display scale is decreased in a section bordering said boundaries forming said selected intersection that has decreased in display size due to said movement of said point corresponding to said selected intersection, and wherein said display range for each of said sections bordering said boundaries forming said selected intersection remains unchanged when said display scale is changed.

12. The display control method according to claim 11, wherein said display object is a map.

13. The display control method according to claim 11, further comprising:

calculating a current position of a vehicle;

displaying a mark representing said current position of said vehicle on a map displayed on an entirety of said display window; and moving a range of said map displayed on said entirety of said display window, according to movement of said current position of said vehicle.

14. A display control method for controlling a display of a text string, using a display processing device for displaying a text string in a display window, said method comprising:

sectioning a display window, by a processor, at a position specified by a user, so as to divide said display window into a first section disposed toward a leading side of said text string, and a second section disposed toward a trailing side of said text string, wherein said display window is sectioned in a state where at least a portion of said leading side of said text string is displayed in said display window;

accepting boundary moving operations from an input device that accepts tracing operations for a boundary disposed between said first and second sections;

moving said boundary;

changing a display range for said first and second sections if said boundary is moved in a direction toward said leading side of said text string, such that a portion of said text string displayed in said first section is displayed in a reduced display range, and a second portion of said text string following said first portion is displayed in an increased display range that results in an increased number of characters being displayed in said second section; and changing a display scale for said first and second sections in response to said boundary having been moved in a direction toward said trailing side of said text string, such that said portion of said text string being displayed in said first section prior to said movement of said boundary is displayed at a display scale increased by an amount corresponding to said movement of said boundary, and said portion of said text string being displayed in said second section prior to said movement of said boundary is displayed in a reduced display scale.

15. A non-transitory computer-readable medium and computer-executable program stored on the non-transitory computer-readable medium, said program comprising a set of instructions for controlling a display, said set of instructions causing a processor to perform the acts of:

dividing a display window into four or more rectangular sections, and setting a linear boundary between adjacent sections, wherein said boundaries form intersections at one or more points where said boundaries intersect;

accepting a boundary moving operation or an intersection moving operation from a user, said moving operations defined by dragging a boundary or a point corresponding to an intersection;

moving a selected boundary or a selected intersection;

changing a display range for a portion of a display object to be displayed in a section bordering said selected boundary, wherein said display range is changed for each section bordering said selected boundary by an amount corresponding to a change in display size due to said movement of said selected boundary, wherein said display range is increased in a section bordering said selected boundary that has increased in display size due to said movement of said selected boundary, and said display range is decreased in a section bordering said selected boundary that has decreased in display size due to said movement of said selected boundary, and wherein a display range for a portion of an object to be displayed in each section that does not border said selected boundary remains unchanged when said display range is changed for each section that borders said selected boundary; and changing a display scale for each section in said plurality of sections that borders said boundaries forming said selected intersection in response to said movement of said point corresponding to said selected intersection, such that said display scale of a section bordering said boundaries forming said selected intersection is changed by an amount corresponding to said change in size of said section bordering said boundaries forming said selected intersection after said point corresponding to said selected intersection is moved.

16. A non-transitory computer-readable medium and computer-executable program stored on the non-transitory computer readable medium, said program comprising a set of instructions for controlling a display, said set of instructions causing a processor to perform the acts of:

dividing a display window into four or more rectangular sections, and setting a linear boundary between adjacent sections, wherein said boundaries form intersections at one or more points where said boundaries intersect;

accepting a boundary moving operation or an intersection moving operation from a user, said moving operations defined by dragging a boundary or a point corresponding to an intersection;

moving a selected boundary or a selected intersection;

changing a display scale of a display range for a portion of said display object to be displayed in a section bordering said boundaries forming said selected intersection in response to said movement of said point corresponding to said selected intersection, wherein said display scale is changed for each section in said plurality of sections by an amount corresponding to a change in a display size due to said movement of said point corresponding to said selected intersection, wherein said display scale is increased in a section bordering said boundaries forming said selected intersection that has increased in display size due to said movement of said point corresponding to said selected intersection, and said display scale is decreased in a section bordering said boundaries forming said selected intersection that has decreased in display size due to said movement of said point corresponding to said selected intersection, and wherein said display range for each of said sections bordering said boundaries forming said selected intersection remains unchanged when said display scale is changed.

17. A non-transitory computer-readable medium and computer-executable program stored on the non-transitory computer readable medium, said program comprising a set of instructions for controlling a display, said set of instructions causing a processor to perform the acts of:

sectioning a display window at a position specified by a user, so as to divide said display window into a first section disposed toward a leading side of said text string, and a second section disposed toward a trailing side of said text string, wherein said display window is sectioned in a state where at least a portion of said leading side of said text string is displayed in said display window;

accepting boundary moving operations from an input device that accepts tracing operations for a boundary disposed between said first and second sections;

moving said boundary;

changing a display range for said first and second sections if said boundary is moved in a direction toward said leading side of said text string, such that a portion of said text string displayed in said first section is displayed in a reduced display range, and a second portion of said text string following said first portion is displayed in an increased display range that results in an increased number of characters being displayed in said second section; and changing a display scale for said first and second sections in response to said boundary having been moved in a direction toward said trailing side of said text string, such that said portion of said text string being displayed in said first section prior to said movement of said boundary is displayed at a display scale increased by an amount corresponding to said movement of said boundary, and said portion of said text string being displayed in said second section prior to said movement of said boundary is displayed in a reduced display scale.

* * * * *